(12) United States Patent
Hossain et al.

(10) Patent No.: US 11,371,394 B2
(45) Date of Patent: Jun. 28, 2022

(54) METHODS AND SYSTEMS FOR DIESEL FUELED CLC FOR EFFICIENT POWER GENERATION AND $CO_2$ CAPTURE

(71) Applicant: KING FAHD UNIVERSITY OF PETROLEUM AND MINERALS, Dhahran (SA)

(72) Inventors: Mohammad Mozahar Hossain, Dhahran (SA); Muflih Arisa Adnan, Dhahran (SA); Iswan Pradiptya, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 524 days.

(21) Appl. No.: 16/502,261

(22) Filed: Jul. 3, 2019

(65) Prior Publication Data

US 2021/0003041 A1    Jan. 7, 2021

(51) Int. Cl.
*F01K 23/10*        (2006.01)
*F02C 7/22*         (2006.01)
(Continued)

(52) U.S. Cl.
CPC .............. *F01K 23/10* (2013.01); *C10J 3/463* (2013.01); *C10J 3/723* (2013.01); *F01K 7/16* (2013.01);
(Continued)

(58) Field of Classification Search
CPC .... C10J 3/463; C10J 3/723; C10J 2300/1612; C10J 2300/1671; F02C 3/22; F02C 7/22;
(Continued)

(56) References Cited

U.S. PATENT DOCUMENTS 8,496,909 B2 *  7/2013  Ramkumar .............. C10K 3/04
                                                        423/655
8,916,128 B2   12/2014  Hoteit et al.
(Continued)

FOREIGN PATENT DOCUMENTS

CN          106784936 A      5/2017

OTHER PUBLICATIONS

F. García-Labiano, et al., "Combustion and Reforming of Liquid Fossil Fuels through Chemical Looping Processes: Integration of Chemical Looping Processes in a Refinery", Energy Procedia, vol. 114, 2017, pp. 325-333.

(Continued)

*Primary Examiner* — Pedro J Cuevas
(74) *Attorney, Agent, or Firm* — Oblon, McClelland, Maier & Neustadt, L.L.P.

(57) ABSTRACT

An integrated chemical looping combustion (CLC) electrical power generation system and method for diesel fuel combining four primary units including: gasification of diesel to ensure complete conversion of fuel, chemical looping combustion with supported nickel-based oxygen carrier on alumina, gas turbine-based power generation and steam turbine-based power generation is described. An external combustion and a heat recovery steam generator (HRSG) are employed to maximize the efficiency of a gas turbine generator and steam turbine generator. The integrated CLC system provides a clean and efficient diesel fueled power generation plant with high $CO_2$ recovery.

18 Claims, 22 Drawing Sheets

(51) Int. Cl.
F02C 3/22 (2006.01)
F01K 23/18 (2006.01)
F01K 19/02 (2006.01)
F01K 13/02 (2006.01)
F01K 7/16 (2006.01)
H02K 7/18 (2006.01)
F02C 9/40 (2006.01)
C10J 3/46 (2006.01)
C10J 3/72 (2006.01)

(52) U.S. Cl.
CPC .............. F01K 13/02 (2013.01); F01K 19/02 (2013.01); F01K 23/18 (2013.01); F02C 3/22 (2013.01); F02C 7/22 (2013.01); F02C 9/40 (2013.01); H02K 7/1823 (2013.01); C10J 2300/1612 (2013.01); C10J 2300/1671 (2013.01); F05D 2220/32 (2013.01); F05D 2220/722 (2013.01); F05D 2220/76 (2013.01)

(58) Field of Classification Search
CPC ..... F02C 9/40; F02C 3/24; F02C 6/18; H02K 7/1823; Y02E 20/16; Y02E 20/18; Y02E 20/34; Y02E 50/10; Y02E 20/14; C01B 2203/025; C01B 2203/06; C01B 2203/1247; C01B 2203/84; C01B 3/36; Y02P 20/10; Y02P 20/129; F05D 2220/32; F05D 2220/722; F05D 2220/76; F05D 2220/75; F22B 1/1815
See application file for complete search history.

(56) References Cited

U.S. PATENT DOCUMENTS

| | | | | |
|---|---|---|---|---|
| 9,174,844 | B2* | 11/2015 | Ramkumar | C10K 1/003 |
| 9,458,024 | B2* | 10/2016 | Merritt | B01D 53/002 |
| 9,702,348 | B2* | 7/2017 | Ma | F28D 20/003 |
| 9,765,961 | B2 | 9/2017 | Hoteit | |
| 10,125,323 | B2 | 11/2018 | Hoteit et al. | |
| 10,189,709 | B2* | 1/2019 | Mokheimer | C01B 3/382 |
| 10,228,131 | B2* | 3/2019 | Merritt, Jr. | C01B 3/042 |
| 10,597,292 | B2* | 3/2020 | Mokheimer | C01B 3/382 |
| 11,097,221 | B2* | 8/2021 | Lu | C01B 32/50 |
| 11,155,463 | B2* | 10/2021 | Mokheimer | C01B 13/0251 |
| 2009/0000194 | A1* | 1/2009 | Fan | C10J 3/725 48/199 R |
| 2011/0198861 | A1* | 8/2011 | Jallais | F23C 13/00 422/619 |
| 2011/0200520 | A1* | 8/2011 | Ramkumar | C01B 3/583 423/655 |
| 2012/0214106 | A1* | 8/2012 | Sit | F23C 10/01 431/7 |
| 2014/0144082 | A1* | 5/2014 | Fan | C01B 3/56 48/210 |
| 2014/0158030 | A1* | 6/2014 | Jadhav | F23L 7/007 110/345 |
| 2014/0158939 | A1* | 6/2014 | Ramkumar | C01B 3/344 252/373 |
| 2014/0298822 | A1* | 10/2014 | Ma | F28D 20/003 60/39.12 |
| 2015/0291438 | A1* | 10/2015 | Merritt | C01B 3/042 423/352 |
| 2016/0045841 | A1* | 2/2016 | Kaplan | C01B 32/05 429/49 |
| 2017/0009983 | A1* | 1/2017 | Merritt, Jr. | B01D 53/1475 |
| 2018/0370796 | A1* | 12/2018 | Mokheimer | C01B 13/0251 |
| 2019/0135627 | A1* | 5/2019 | Mokheimer | C01B 3/382 |
| 2019/0135628 | A1* | 5/2019 | Mokheimer | C01B 3/384 |
| 2019/0277497 | A1* | 9/2019 | Merritt | C01B 3/586 |
| 2020/0095898 | A1* | 3/2020 | Hossain | F01K 23/106 |
| 2020/0108346 | A1* | 4/2020 | Lu | B01D 53/96 |
| 2021/0003041 | A1* | 1/2021 | Hossain | F02C 3/24 |

OTHER PUBLICATIONS

"Chemical-looping combustion simulation model with Aspen PLUS", Väänänen, Aatu-Ville, http://lutpub.lut.fi/handle/10024/155155, Apr. 25, 2018, 30 pages.

H. C. Mantripragada, et al., "(329d)Chemical Looping Combustion (CLC)-Aided Biomass Gasification for Co-Production of Hydrogen and Electricity", AICHIE Annual Meeting, CO2 Capture, Utilization, and Disposal: Key to Clean Energy Production, 2018, 4 pages.

Vincenzo Spallina, et al., "Integration of coal gasification and packed bed CLC process for high efficiency and near-zero emission power generation", Energy Procedia, vol. 37, 2013, pp. 662-670.

Stefano Consonni, et al., "Chemical-Looping Combustion for Combined Cycles With $CO_2$ Capture", Journal of Engineering for Gas Turbines and Power, Transactions of the ASME, vol. 128, Jul. 2006, pp. 525-534.

Muflih A. Adnan, et al., "Integrated liquid fuel based chemical looping combustion—parametric study for efficient power generation and $CO_2$ capture", Applied Energy, vol. 228, 2018, pp. 2398-2406.

* cited by examiner

METHODS AND SYSTEMS FOR DIESEL FUELED CLC FOR EFFICIENT POWER GENERATION AND CO₂ CAPTURE

STATEMENT OF ACKNOWLEDGEMENT

The author(s) would like to acknowledge the financial support provided by the Deanship of Scientific Research (DSR) at King Fahd University of Petroleum & Minerals (KFUPM), Saudi Arabia through project No. IN161022. The author (s) also would like to thank the Department of Chemical Engineering at Universitas Islam Indonesia for support and use of facilities.

STATEMENT REGARDING PRIOR DISCLOSURE BY THE INVENTORS

Aspects of this technology are described in an article "Integrated liquid fuel based chemical looping combustion—parametric study for efficient power generation and CO2 capture" published in Applied Energy, Vol. 228, pp. 2398-2406, on Oct. 15, 2018, which is incorporated herein by reference in its entirety.

BACKGROUND

Technical Field

The present disclosure is directed to methods and systems for diesel fueled chemical-looping combustion (CLC) electrical power generation with high $CO_2$ recovery.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Worldwide electricity demand is directly related to increases in world population and the quality of human life. Consequently, there has been significant growth of electricity production using various sources, including fossil fuels, nuclear resources, hydroelectric and renewable resources. Despite numerous efforts in developing alternative technologies for electricity production, the largest share of electricity demand continues to be met by conventional fossil fuel based power-generating stations. Unfortunately, fossil fuel powered electricity generation is a major contributor to total greenhouse gas emissions, which is primarily responsible for global warming. (See "Annual Energy Outlook 2018 with projections to 2050". Washington: U.S. Energy Information Administration; 2018, https://www.eia.gov/outlooks/aeo/pdf/AEO2018.pdf).

Estimations show that one third of the global $CO_2$ emission originates from fossil fuel combustion. World efforts to minimize the negative impacts of fossil fuel based power generation on the environment by minimizing the $CO_2$ released into the atmosphere have intensified. In this regard, a number of alternative $CO_2$ capture and sequestration technologies have been investigated. These alternative technologies are generally based on either pre-combustion or post combustion approaches. (See Jiang G, Huang Q, Kenarsari S D, Hu X, Russell A G, Fan M, et al. "A new mesoporous amine-TiO2 based pre-combustion CO2 capture technology". Appl Energ. 2015, Vol. 147, pp. 214-230; and Shakerian F, Kim K-H, Szulejko J E, Park J-W. "A comparative review between amines and ammonia as sorptive media for post-combustion CO2 capture". Appl Energ. 2015, Vol. 148, pp. 10-22, each incorporated herein by reference in their entirety). These techniques provide high performance of $CO_2$ capture and release only minimal concentrations of $CO_2$ into the atmosphere. However, all these technologies are highly energy-intensive, which reduces the overall electrical efficiency and contributes to high electricity production/supply costs.

Concerning this issue, chemical looping combustion (CLC) offers advantages in cutting energy penalties for zero-$CO_2$ emissions from fossil fuel based power plants. (See Hossain M M, de Lasa H I. "Chemical-looping combustion (CLC) for inherent CO2 separations—a review". Chem Eng Sci. 2008, Vol. 63, pp. 4433-4451, incorporated herein by reference in its entirety). The CLC process utilizes metal oxide as a $N_2$-free oxygen source for oxidation reactions, which results in a no-dilution effect of $N_2$ in the flue gas. Thus, pure $CO_2$ can be recovered by condensing water without requiring any energy for $CO_2$ separation. The separated high purity of $CO_2$ has a wide variety of applications including the food and methanol industries. (See Zhang Q, Nurhayati, Cheng C-L, Nagarajan D, Chang J-S, Hu J, et al. "Carbon capture and utilization of fermentation CO2: Integrated ethanol fermentation and succinic acid production as an efficient platform". Appl Energ. 2017, Vol. 206, pp. 364-371; and Milani D, Khalilpour R, Zahedi G, Abbas A. "A model-based analysis of CO2 utilization in methanol synthesis plant". J CO2 Util. 2015, Vol. 10, pp. 12-22, each incorporated herein by reference in their entirety).

A chemical looping combustion (CLC) apparatus and/or system may include two interconnected fluidized-reactors (i.e., oxidation reactor and reduction reactor), in which an oxygen carrier is circulated. The oxygen carrier, typically an oxidized metal or mineral, is directed to the reduction reactor to supply oxygen required for fuel combustion. The products of the reaction occurring in the reduction reactor include reduced metal, $CO_2$ and $H_2O$ according to the following reactions:

$$(2j+k)M_xO_y + C_jH_{2k} \rightarrow (2j+k)M_xO_{y-1} + kH_2O + jCO_2 \quad (1)$$

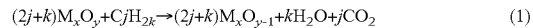

The gaseous product, which only contains only or consists of $CO_2$ and $H_2O$, is sent to the $CO_2$ purification process by facilitating $H_2O$ condensation. The reduced metal is sent to the oxidation reactor to be re-oxidized using the oxygen from air. The conversion of reduced metal into oxidized metal can be achieved as follows:

$$M_xO_{y-1} + \tfrac{1}{2}O_2 \rightarrow M_xO_y \quad (2)$$

It is worth noting that the sum of heat generation in the reduction and oxidation reactors is same as the conventional oxidation of fuel using air. (See Mattisson T, Järdnäs A, Lyngfelt A. "Reactivity of some metal oxides supported on alumina with alternating methane and oxygen—Application for chemical-looping combustion". Energy and Fuels. 2003, Vol. 17, pp. 643-651, incorporated herein by reference in its entirety). Therefore, the CLC system offers a win-win situation by not only generating electrical power, but also eliminating the energy penalty for $CO_2$ separation from flue gas streams. In addition, the risk of $NO_x$ formation is minimal in the CLC based system due to the absence of nitrogen contact with oxygen during combustion of fuel. (See Ishida M, Jin H. "A Novel Chemical-Looping Combustor without NOx Formation". Industrial & Engineering Chemistry Research. 1996, Vol. 35, pp. 2469-2472, incorporated herein by reference in its entirety). With this end, the development of CLC systems has received remarkable attention from industry and the scientific community over the last decade.

CLC research has been concerned with the use of gaseous and solid fuels. (See Mattisson T, Keller M, Linderholm C, Moldenhauer P, Rydén M, Leion H, et al. "Chemical-looping technologies using circulating fluidized bed systems: Status of development". Fuel Process Technol. 2018, Vol. 172, pp. 1-12, incorporated herein by reference in its entirety). However, there are countries, such as Saudi Arabia and Indonesia, which rely on diesel fueled power generation (e.g., a liquid fuel). (See Liu H, Tellez B G, Atallah T, Barghouty M. "The role of CO2 capture and storage in Saudi Arabia's energy future". International Journal of Greenhouse Gas Control. 2012, Vol. 11, pp. 163-171, incorporated herein by reference in its entirety). Unfortunately, diesel engine generators exhibit moderate performance with an average efficiency of 30%. This indicates that most of the energy from diesel combustion is dispersed into the environment instead of being converted into electricity, resulting in a large $CO_2$ emission factor (ton $CO_2$/MWh). Diesel based power generation has the second largest emission factor after coal-based power generators. (See Matar W, Echeverri R, Pierru A. "The prospects for coal-fired power generation in Saudi Arabia". Energy Strategy Reviews. 2016, Vol. 13, pp. 181-190, incorporated herein by reference in its entirety). Therefore, development of diesel based CLC technology is exceptionally important for building a sustainable energy system, particularly one for oil producing countries. Efforts have been made to develop liquid fuel based CLC for which kerosene is used as the liquid fuel with different oxygen carriers including iron, nickel, copper and manganese based materials. The robustness of CLC processes that use liquid fuels to produce heat has been the topic of the research. (See Moldenhauer P, Rydén M, Mattisson T, Younes M, Lyngfelt A. "The use of ilmenite as oxygen carrier with kerosene in a 300 W CLC laboratory reactor with continuous circulation". Appl Energ. 2014, Vol. 113, pp. 1846-1854; Moldenhauer P, Rydén M, Mattisson T, Lyngfelt A. "Chemical-looping combustion and chemical-looping reforming of kerosene in a circulating fluidized-bed 300 W laboratory reactor". International Journal of Greenhouse Gas Control. 2012, Vol. 9, pp. 1-9; and Moldenhauer P, Rydén M, Mattisson T, Lyngfelt A. "Chemical-looping combustion and chemical-looping with oxygen uncoupling of kerosene with Mn- and Cu-based oxygen carriers in a circulating fluidized-bed 300 W laboratory reactor". Fuel Process Technol. 2012, Vol. 104, pp. 378-389, each incorporated herein by reference in their entirety). Compared with the gaseous fuels, liquid fuel exhibits lower conversion rates during CLC processes. (See Mattisson T, Johansson M, Lyngfelt A. "The use of NiO as an oxygen carrier in chemical-looping combustion". Fuel. 2006, Vol. 85, pp. 736-747, incorporated herein by reference in their entirety). The minimum conversion rate of liquid fuel is a critical issue, as it can reduce overall CLC efficiency. In general, mass transfer in gas-solid reactions is more efficient than its counterpart in liquid-solid reactions.

Several attempts have been made to enhance fuel conversion. The performance of kerosene-fueled CLC processes using ilmenite natural minerals as the oxygen carrier has been a topic of research. The maximum fuel conversion was found to be 84% at 900° C. Research into the nickel- and manganese-based oxygen carrier N4MZ-1400, which contains 40 wt % NiO on 60 wt % Mg-stabilized $ZrO_2$ reported nearly complete kerosene conversion with attrition of only a small portion of oxygen carrier particles. The manganese- and copper-based oxygen carriers N4MZ-1200 showed similar results. Research into the reliability of an Fe-based oxygen carrier in a 1 $kW_{th}$ CLC using diesel oil reported 95% fuel combustion efficiency with oxygen carrier to fuel ratio of 4 at 900° C. (See Serrano A, Garcia-Labiano F, de Diego L F, Gayán P, Abad A, Adánez J. "Chemical Looping Combustion of liquid fossil fuels in a 1 kWth unit using a Fe-based oxygen carrier". Fuel Process Technol. 2017, Vol. 160, pp. 47-54, incorporated herein by reference in its entirety). In addition to oxygen carriers, research has concentrated on pre-treatment of liquid fuel. Fuel conversion was increased by vaporizing kerosene fuel and introducing steam prior to the reduction reactor. High kerosene conversion (95-99%) in a 300 W CLC unit using a NiO-based oxygen carrier was reported. (See Rydén M, Moldenhauer P, Mattisson T, Lyngfelt A, Younes M, Niass T, et al. "Chemical-Looping Combustion with Liquid Fuels" Energy Procedia. 2013, Vol. 37, pp. 654-661, incorporated herein by reference in its entirety).

The prospect of using a nickel-based oxygen carrier in the CLC process has been widely investigated. It was found that bulk NiO is not suitable as an oxygen carrier as it tends to agglomerate at high temperatures. Consequently, bulk NiO will deactivate rapidly during repeated reduction and oxidation cycles. (See Jin H, Ishida M. "A new type of coal gas fueled chemical-looping combustion". Fuel. 2004, Vol. 83, pp. 2411-2417, incorporated herein by reference in its entirety). However, NiO is thermodynamically preferable due to the exothermicity of oxidation and reduction reactions. Reduced Ni has a catalytic effect on reforming reactions which can enhance fuel conversion. (See Mazumder J, de Lasa H. "Fluidizable Ni/La2O3-γAl2O3 catalyst for steam gasification of a cellulosic biomass surrogate". Applied Catalysis B: Environmental. 2014, Vol. 160, pp. 67-79, incorporated herein by reference in its entirety).

The incorporation of NiO on a suitable support can potentially protect NiO from agglomeration. Support materials also play a role as heat carriers during CLC cycles, helping maintain the reaction temperature of the oxidation and reduction reactors. Alumina is of particular interest, as it is thermally stable at high temperatures. This high temperature stability helps to maintain good dispersion of NiO on alumina and prevents agglomeration at high temperatures. (See Adnan M A, Adamu S, Muraza O, Hossain M M. "Fluidizable NiO—Fe2O3/SiO2-γAl2O3 for tar (toluene) conversion in biomass gasification". Process Safety and Environmental Protection. 2018, incorporated herein by reference in its entirety).

In addition, alumina-supported NiO exhibits a high surface area, which has a positive effect on the rate of reactions. (See Hossain M M, Sedor K E, de Lasa H I. "Co—Ni/$Al_2O_3$ oxygen carrier for fluidized bed chemical-looping combustion: Desorption kinetics and metal-support interaction". Chem Eng Sci. 2007, Vol. 62, pp. 5464-5472, incorporated herein by reference in its entirety).

As mentioned above, a nickel-based oxygen carrier is desirable as it provides highly exothermic oxidation reactions. The heat of reaction is critical given that it determines the CLC efficiency. Operation temperatures have a significant influence on the efficiency of a turbine as a power generator. Higher turbine efficiency can be obtained with higher operation temperatures. (See Zerobin F, Pröll T. "Potential and limitations of power generation via chemical looping combustion of gaseous fuels". International Journal of Greenhouse Gas Control. 2017, Vol. 64, pp. 174-182, incorporated herein by reference in its entirety).

Although efforts have been made towards the development of oxygen carriers, the textural stability of an oxygen carrier at the desired operation temperature is of concern, particularly at industrial-scale CLC. The destructed nickel may be compensated by using an excess oxygen carrier in order to preserve the operation temperature. Unfortunately, the decline in gas turbine efficiency at a minimum operation temperature confines its application to electric power generation industries. This restriction can be resolved by introducing a supplementary heat source including external combustion using air to elevate the flue gas temperature prior to the gas turbine. The penalty due to $CO_2$ emission into the atmosphere from the external combustion is far less than for its counterpart from conventional power generation to reach the desired power output. An increase in gas turbine inlet temperature and electrical efficiency of a CLC unit to 78° C. and 1.9%, respectively, was achieved, as 10% of the natural gas fuel is directed to the combustor prior to the gas turbine inlet. (See Zerobin F, Penthor S, Bertsch O, Pröll T. "Fluidized bed reactor design study for pressurized chemical looping combustion of natural gas". Powder Technology. 2017, Vol. 316, pp. 569-577, incorporated herein by reference in its entirety). Consonni et al., reports an increase in electrical efficiency of 4.3% on a combined CLC system when 10% of the natural gas is fed to the external combustor. (See Consonni S, Lozza G, Pelliccia G, Rossini S, Saviano F. "Chemical-Looping Combustion for Combined Cycles With CO2 Capture". Journal of Engineering for Gas Turbines and Power. 2006, Vol. 128, pp. 525-534, incorporated herein by reference in its entirety).

A gas turbine can be modelled as a Brayton engine, which has three components: a gas compressor, a burner (or combustion chamber), and an expansion turbine. The Brayton cycle models the turbine efficiency and power output with respect to pressure and inlet temperature respectively. The Rankine cycle is an idealized thermodynamic cycle of a heat engine that converts heat into mechanical work while undergoing phase change, and is used to predict the performance of steam turbines. The combination of the Brayton cycle and the Rankine cycle delivers high efficiency in a power generating station. (See Miller J. "2—The combined cycle and variations that use HRSGs A2"—Eriksen, Vernon L. Heat Recovery Steam Generator Technology: Woodhead Publishing; 2017. p. 17-43, incorporated herein by reference in its entirety).

The performance of a combined CLC system for power generation by using heavy oil fuel was previously investigated. Heavy oil was converted into syngas (mainly consisting of $H_2$ and CO) in the gasifier prior to the CLC process to enhance the fuel conversion. The injection of a proper amount of syngas to the external combustion chamber prior to the gas turbine has a positive influence on the electrical efficiency.

The present disclosure describes a diesel fueled chemical-looping combustion (CLC) system for electricity production. The integrated CLC system allows power generation without an energy penalty for $CO_2$ separation due to its ability to capture $CO_2$ with minimal energy requirement. SOX emission is also negligible due to the minimum concentration of sulfur in the diesel. The CLC system of the present disclosure provides a clean and efficient diesel fueled power generation plant.

SUMMARY

The integrated chemical-looping combustion (CLC) electrical power generator, system and method of the present disclosure provide energy efficient, clean electrical power with $CO_2$ recovery.

In an aspect of the present disclosure, a diesel fueled chemical-looping combustion (CLC) electrical power generation system, comprises a feed source of diesel fuel, a gasification chamber fluidly connected to the feed source, the gasification chamber including a first heat exchanger, a gasification reactor and a gasification splitter, a chemical looping combustion chamber fluidly connected to the gasification chamber, the chemical looping combustion chamber including a first reduction reactor, a first splitter, a second reduction reactor and a second splitter, a gas combustion chamber fluidly connected at a first input to a first output of the first splitter and at a second input to the gasification splitter, a gas turbine power generator connected to the combustor, at least one steam turbine electrical power generator, a heat recovery unit fluidly connected to the at least one steam turbine electrical power generator and to the gasification chamber, the heat recovery unit including a second heat exchanger and a plurality of steam generators, and a CO2 gas purification stage connected to the heat recovery unit, the CO2 gas purification stage including a plurality of condensers and a plurality of compressors.

In a further aspect, the present disclosure describes a diesel fueled chemical-looping combustion (CLC) electrical power generation method, comprising heating, by heat from a heat recovery unit, diesel fuel combined with oxygen, wherein the diesel fuel is received from a diesel fuel feed source and the oxygen is received from an oxygen source, separating, by a first gasification reactor, the heated diesel fuel into a gaseous element stream including at least $H_2$, $CO_2$, $H_2O$, $CH_4$ and coke, splitting the gaseous element stream into a first stream and a second stream, separating, by chemical looping combustion, the $CO_2$ and $H_2O$ of the first stream from solid components, combusting, by a combustor, the second stream, converting, by a gas turbine electrical generator, the combusted second stream to electricity and a first exhaust stream, recovering heat, by a heat recovery unit, from the $CO_2$ and the $H_2O$ of the first stream and from the first exhaust stream, outputting, by the heat recovery unit, a cooled exhaust stream comprising $CO_2$ and $H_2O$, converting, by at least one steam generator, the recovered heat and $H_2O$ to steam, generating electricity, by at least one steam turbine electrical generator, from the steam, separating, by at least one condenser of a $CO_2$ gas purification stage, the $CO_2$ from $H_2O$ of the cooled exhaust stream, and storing the $CO_2$.

In another aspect, a controller, having circuitry configured for monitoring and controlling, controls the diesel feed source, the oxygen source, the compressors, the splitter percentages and monitors the electrical output to provide an efficient system and recovery of $CO_2$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
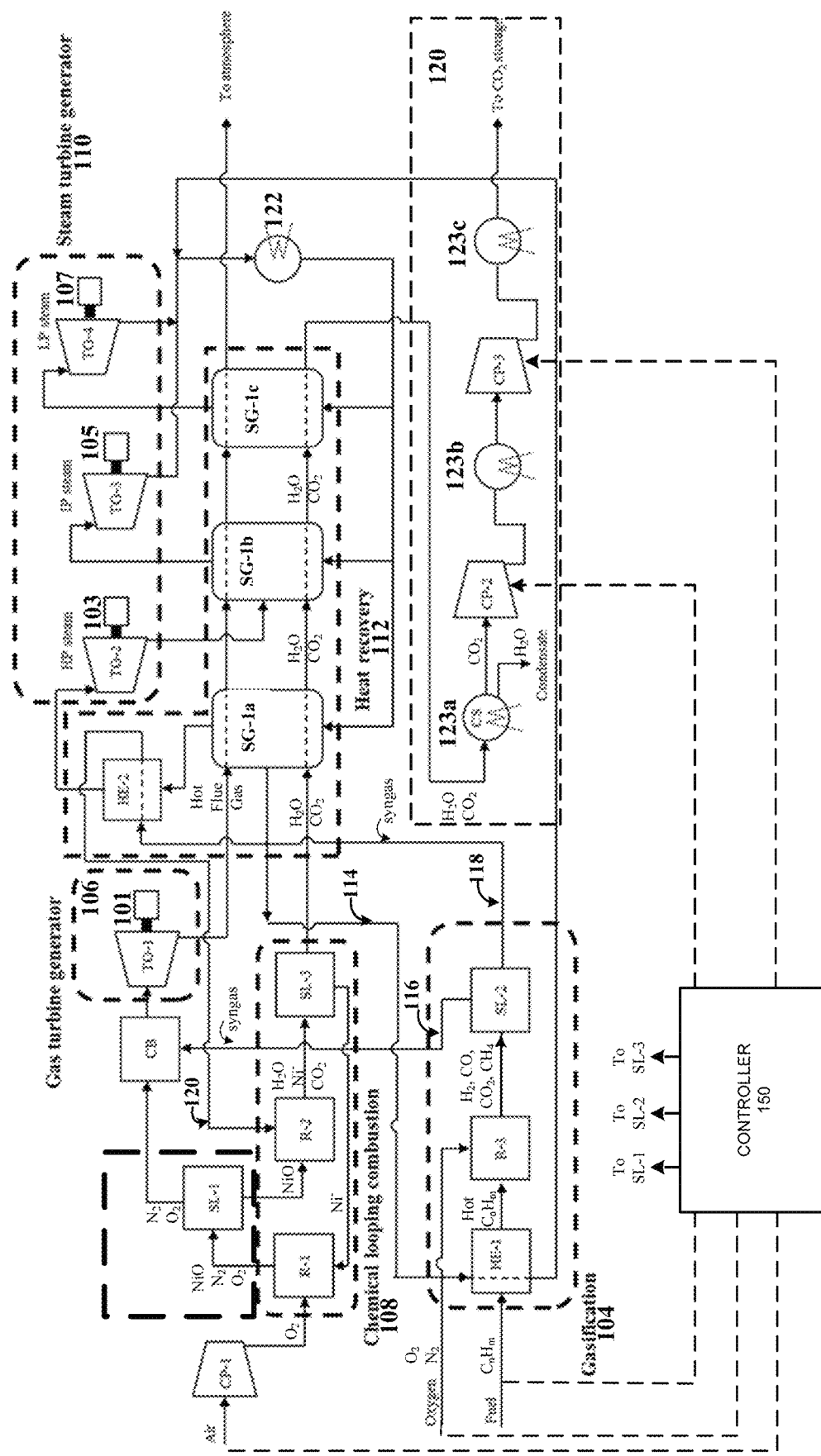
FIG. 1 illustrates the process flow diagram of the CLC-based power generation system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a diesel fueled chemical-looping combustion (CLC) electrical power generation system and a method for diesel fueled chemical-looping combustion (CLC) electrical power generation.

The diesel fueled chemical-looping combustion (CLC) electrical power system and method include an integrated chemical-looping combustion (CLC) electrical power generator that combines four primary units including: (1) gasification of diesel fuel to ensure complete conversion of fuel, (2) chemical looping combustion with supported nickel-based oxygen carrier on alumina, (3) gas turbine-based power generation and (4) steam turbine-based power generation. An external combustion and a heat recovery steam generator (HRSG) are employed to maximize the efficiency of a gas turbine generator and steam turbine generator.

Diesel fuel is any liquid fuel used in diesel engines, whose fuel ignition takes place, without any spark, as a result of compression of the inlet air mixture and then injection of fuel. Petrodiesel may be produced from hydrocarbon deposits, such as coal, oil and natural gas. Biodiesel fuel may include diesel oil, which may be produced from eco-friendly sources, such as seeds, vegetable oil, animal fats and alcohols. Petroleum-derived diesel is composed of about 75% saturated hydrocarbons (primarily paraffins including n, iso, and cycloparaffins), and 25% aromatic hydrocarbons (including naphthalenes and alkylbenzenes). The average chemical formula for common diesel fuel is $C_{12}H_{24}$, ranging approximately from $C_{10}H_{20}$ to $C_{15}H_{28}$.

Gasification is a process which converts low-value feedstocks into the building blocks of high-value fuel and energy products. Gasification converts hydrocarbons such as coal, petroleum coke, and biomass into synthesis gas, or syngas. Syngas is primarily a mixture of carbon monoxide (CO) and hydrogen ($H_2$). Syngas produced from biomass also contains carbon dioxide ($CO_2$) and other contaminants, such as hydrogen chloride (HCl), hydrogen sulfide ($H_2S$), and ammonia ($NH_3$).

Combustion of diesel fuel generates high levels of $CO_2$ laden exhaust. The integrated CLC system of the present disclosure separates the $CO_2$ from the exhaust stream, which may be stored or marketed as a product.

A heat recovery steam generator (HRSG) is an energy recovery heat exchanger that recovers heat from a hot gas stream. It produces steam that can be used in a process (cogeneration) or used to drive a steam turbine (combined cycle). HRSGs consist of four major components: an economizer, evaporator, superheater and water preheater. Economizers are heat exchange devices that heat fluids, usually water, up to but not normally beyond the boiling point of that fluid thus preheating a fluid. In the present disclosure, excess heat from all phases of the electrical power generation process is funneled back to the HRSG.

A combined cycle is a combination of a simple cycle gas turbine (Brayton cycle) and a steam power cycle (Rankine cycle). The Brayton cycle consists of a compressor (CP-1), combustor (CB), and combustion turbine (TG-1, FIG. 1). The exhaust gas from the combustion turbine becomes the heat source for the Rankine cycle portion of the combined cycle. Steam is generated by steam turbines (SG-1a, SG-1b, SG-1c) in the heat recovery steam generator (HRSG) unit 112. The HRSG recovers the waste heat available in the combustion turbine exhaust gas (Note exhaust from TG-1 is fed to SG-1, FIG. 1). The recovered heat is used to generate steam at high pressure and high temperature, and the steam is then used to generate power in the steam turbine generators (TG-2, TG-3, TG-4).

The HRSG is a heat exchanger composed of a series of preheaters (economizers), evaporator, reheaters, and superheaters. The HRSG also has supplemental firing in the duct that raises gas temperature and mass flow. Hot exhaust from the economizer is boiled in the evaporator. When water is heated in an evaporator section and steam is generated, an increase in evaporator section pressure occurs. As the pressure increases, the temperature of the boiler water rises. The temperature at which boiling occurs for any given pressure is constant and is called the saturation temperature. At saturation, the temperature of the water and the steam are equal. The HRSG absorbs heat energy from the exhaust gas stream of the combustion turbine. The absorbed heat energy is converted to thermal energy as high temperature and pressure steam. The high-pressure steam is then used in the steam turbine generators to produce rotational mechanical energy. The shaft of each steam turbine is connected to an electrical generator that then produces electrical power.

As described below, the waste heat is recovered from the combustion turbine exhaust gas streams (outlet stream of SL-2 and outlet stream of SL-3) through absorption by the HRSG. The exhaust gas stream (either from SL-2 or SL-3) is a large mass flow stream with temperature of about 287 C.

The chemical looping combustion (CLC) power generating system of the present disclosure is shown in FIG. 1, and consists of four primary units: (1) a gasification process 104, (2) a CLC process 108, (3) a gas turbine electrical generator 106 and (4) a steam turbine electrical generator 110. The inclusion of heat recovery process 112 (HSRG) raises the power output of the steam turbine generator.

In FIG. 1, the connections between the components are pipes or tubing and carry steam or exhaust products.

Diesel fuel is heated in heat exchanger-1 (HE-1) by utilizing heat from the heat recovery unit 112 (see heat line 114) before entering the gasification reactor (R-3). The heat recovered is approximately 290° C.

Gasification is a process that converts organic- or fossil fuel-based carbonaceous materials into carbon monoxide, hydrogen and carbon dioxide. This is achieved by reacting the material at high temperatures (>700° C.), without combustion, with a controlled amount of oxygen and/or steam. The resulting gas mixture is called syngas (from synthesis gas) or producer gas and is itself a fuel.

The advantage of gasification is that using the syngas (synthesis gas H2/CO) is potentially more efficient than direct combustion of the original fuel because it can be combusted at higher temperatures or even in fuel cells, so that the thermodynamic upper limit to the efficiency defined by Carnot's rule is higher or (in case of fuel cells) not applicable.

In other streams, high-purity $O_2$ (95% $O_2$, 5% $N_2$) from an $O_2$ purification unit is directed to R-3. The percentage of $O_2$ is determined according to the key properties of diesel, as tabulated in Table 1. The combination of $O_2$ with the diesel results in an exothermic gasification reaction, converting diesel into gaseous elements including $H_2$, CO, $CO_2$ and $CH_4$, called syngas; and minimum amounts of coke. The temperature in the gasification reactor ranges between 730° C. and 3075° C., preferably between 750° C. and 2360 C.

In the present disclosure, fluidized coke is assumed to be homogeneously mixed with the syngas due to the intense fluidization conditions inside the reactor. The high-temperature gasification product is directed to the splitter-2 (SL-2) to distribute the syngas plus coke into two streams: (1) to the reduction reactor (R-2) through the heat exchanger-2 (HE-2) to maximize the steam temperature prior to entering the HP stream (see line 118 between SL-2 and HE-2 and HE-2 output line 120 returning hot gas to R2, FIG. 1), and (2) to the external combustor (CB) (see 116, FIG. 1) to combust the gas which enters the gas turbine generator (TG-1). In R-2, the syngas from the splitter-1 (SL-1) reacts with the nickel oxide (NiO) converting NiO and syngas into reduced nickel (Ni), and $CO_2$ and $H_2O$, respectively. The Ni-based oxygen carrier is supported on alumina ($Al_2O_3$) to assure suitable fluidization. The products of R-2 are sent to splitter-3 (SL-3) to separate the solid products (reduced oxygen carrier) from the gaseous products ($CO_2$ and $H_2O$). The solid product is then sent to the oxidation reactor (R-1) while the gaseous products are directed to the heat recovery unit, consisting of steam generators 1, 2 and 3 (SG-1, SG-2, and SG-3), and condenser (CS) to separate the condensed water from $CO_2$. The pressure in the steam generators SG-1$a$, SG-1$b$, SG-1$c$ is targeted to be 1.8 bar, 18.4 bar and 78.2 bar respectively. Then, the $CO_2$ is compressed (CP-2, CP-3) before being sent to other industries or $CO_2$ storage. In R-1, the reduced Ni (on $Al_2O_3$) is re-oxidized with excess $O_2$, as a component of air, received from the atmosphere using an air compressor (CP-1). The product of R-1 is then sent to SL-1 to separate the solid products (i.e., NiO) from the gaseous products (i.e., $O_2$ and $N_2$). The solid product is sent to R-2 while the gaseous product is directed to CB. As mentioned above, the $O_2$ from SL-1 reacts with the syngas from SL-2 to promote exothermic oxidation reactions which lead to higher temperatures of the TG-1 feed. The outlet stream of TG-2 is connected to the heat recovery 112 unit for enhancing the output of the steam turbine generator unit, before releasing the flue gas to the atmosphere. The reaction involved in this process is summarized as follows:

Gasification Reaction:

$$C_nH_m + n/2 O_2 \leftrightarrow nCO + m/2 H_2 \quad (3)$$

Reduction Reactions:

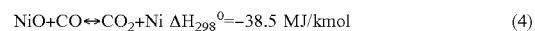

$$NiO + CO \leftrightarrow CO_2 + Ni \quad \Delta H_{298}^0 = -38.5 \text{ MJ/kmol} \quad (4)$$

$$NiO + H_2 \leftrightarrow H_2O + Ni \quad \Delta H_{298}^0 = 2.7 \text{ MJ/kmol} \quad (5)$$

Oxidation Reaction

$$Ni + \tfrac{1}{2}O_2 \leftrightarrow NiO \quad \Delta H_{298}^0 = -244.5 \text{ MJ/kmol} \quad (6)$$

TABLE 1

| Analysis of diesel oil | |
|---|---|
| Parameter | Value |
| Mass fraction | % wt. |
| Water content | 0.0038 |
| C | 88.5 |
| H | 13.5 |
| O | 0 |
| N | 0 |
| S | 0 |
| Lower Heating value, MJ/kg | 45.825 |

(See Silitonga A S, Ong H C, Mahlia T M I, Masjuki H H, Chong W T. Characterization and production of *Ceiba pentandra* biodiesel and its blends. Fuel. 2013, Vol. 108, pp. 855-858, incorporated herein by reference in its entirety).

The first embodiment is illustrated by FIG. 1. The first embodiment describes a diesel fueled chemical-looping combustion (CLC) electrical power generation system 100 that includes an integrated chemical looping combustion electrical power generator that combines a gasification chamber 118 fluidly connected to a diesel fuel feed source, a chemical looping combustion chamber 114 fluidly connected to the gasification chamber, a gas turbine power generator 106, at least one steam turbine electrical power generator 110 and a heat recovery unit 112 fluidly connected to the at least one steam turbine electrical power generator and to the gasification chamber.

The first embodiment further includes a $CO_2$ gas purification stage 120 connected to the heat recovery unit.

The feed fuel is diesel fuel, which may be from hydrocarbon sources. In a non-limiting example, the diesel fuel is diesel oil, which may be produced from eco-friendly sources, such as seeds, vegetable oil, animal fats and alcohols.

The diesel fueled chemical-looping combustion (CLC) electrical power generation system further includes a first splitter (SL-1) and a gas combustion chamber (CB), wherein a first input of the gas combustion chamber is connected to a first output of the first splitter, a second input of the gas combustion chamber is connected to the gasification chamber and an output of the gas combustion chamber is connected to the gas turbine power generator.

Splitters (S-1, S-2, S-3) are divided tubes. Each plenum is controlled by a valve which adjusts the percentage of gas flowing through the plenum. The valves may be controlled manually or electronically. Splitter S-1 sends the $O_2$, $N_2$ mix (from first reduction reactor R-1) to the gas combustion chamber (CB) and the NiO to reduction reactor R-2. Splitter S-2 sends 5% of the syngas from R-3 to combustor (CB) and 95% to a second heat exchanger HE-2. Splitter S-3 sends the solid product reduced Ni back to R-1 and the gaseous products $H_2O$ and $CO_2$ to a first steam generator in the heat recovery unit 112.

The gasification chamber 116 comprises a first heat exchanger (HE-1), a gasification reactor (R-3) and a second splitter (SL-2), wherein the first heat exchanger is connected at a first input to the feed source, at a second input to the heat recovery unit 112 and at a first output to the at least one steam turbine electrical power generator 110. The diesel feed source may include a first valve to regulate the amount of diesel fuel entering the heat exchanger HE-1. The first reduction reactor (R-3) is connected at a first input to a second output of the first heat exchanger (HE-1) and the second splitter (SL-2) is connected at an input to an output of the first reduction reactor (R-3).

The first heat exchanger (HE-1), preferably a shell and tube heat exchanger, uses heat from the heat recovery unit 112 to preheat the diesel fuel before it enters the gasification reactor (R-3). The heat exchanger receives the heat at a heat input port which is connected internally to a coiled pipe. Diesel fuel entering the first heat exchanger increases in temperature as it passes through the coiled pipe.

The electrical power generation system further comprises an oxygen source connected to a second input of the first reduction reactor (R-3). The oxygen is mixed with a small amount (5%) of $N_2$ as described above. The pressure of the oxygen is controlled by a second valve. The amount of oxygen added and its pressure drives the gasification reaction along with the pressure of the diesel fuel feed, as these pressures control the residence time of the fuel within the gasification reactor. The residence time may be between 30 s and 10 minutes, preferably between 1 and 8 minutes. The combination of $O_2$ with the heated diesel fuel results in an exothermic gasification reaction, converting diesel into gaseous elements including H2, CO, CO2 and CH4, called syngas; and minimum amounts of coke.

A first output of the second splitter (SL-2) is connected to the second input of the gas combustion chamber (CB).

The chemical looping combustion chamber includes a first reduction reactor (R-1), a second reduction reactor (R-2), and a third splitter (SL-3).

A first input of the first reduction reactor is connected by a third valve to a source of compressed air (CP-1), an output of the first reduction reactor is connected to an input of the first splitter (SL-1), a first input of the second reduction reactor (R-2) is connected to a second output of the first splitter (SL-1), an input of the third splitter (SL-3) is connected to an output of the second reduction reactor (R-2), a first output of the third splitter is connected to a second input of the second heat recovery unit 112 and a second output of the third splitter is connected to a second input of the heat recovery unit 112.

The first reduction reactor (R-1) includes a Ni-based oxygen carrier supported on a fluidized bed of alumina ($Al_2O_3$). Mixing $O_2$ with reduced Ni generates a mixed gas including $O_2$, $N_2$ and NiO. The gas turbine electrical power generator 106 further comprises a gas turbine configured to generate electricity, a first electrical output connector 101 and an exhaust output. A gas turbine is a combustion engine that can convert liquid fuels to mechanical energy. To generate electricity, the gas turbine heats a mixture of air and fuel at very high temperatures, causing the turbine blades to spin. The combustor provides the high temperature liquid fuel to the gas turbine to turn the turbine blades. The spinning turbine drives a generator that converts the energy into electricity. The fast-spinning turbine blades rotate the turbine drive shaft. The spinning turbine is connected to the shaft in a generator that turns a large magnet surrounded by coils of copper wire. The fast-revolving generator magnet creates a powerful magnetic field that lines up the electrons around the copper coils and causes them to move, generating electricity. This process also generates exhaust (hot flue gas, FIG. 1), containing $CO_2$, hot air, and particulates, such as soot. The exhaust is sent to the steam generators (SG-1$a$-$c$) of the heat recovery unit 112.

The heat recovery unit includes a second heat exchanger (HE-2) and a plurality of steam generators (SG-1$a$). A first input of the second heat exchanger is connected to a second output of the second splitter (SL-2), a second input is connected to an output of a first steam generator (SG-1$a$) and a first output is connected to a second input of the third reduction reactor (R-2). A first input of a first steam generator is connected to the exhaust output of the gas turbine generator 106, a second input is connected to a second output of the third splitter (SL-3) and a first output is connected to a second input of the first heat exchanger (HE-1).

A steam generator is a low water-content boiler. A controllable heat source, called a burner generates steam in a spiral coil of water tube, arranged as a coil. Circulation is once-through and pumped under pressure. The pump flow-rate is adjustable, according to the quantity of steam required at that time. The burner is throttled to maintain a constant working temperature. The burner output required varies according to the quantity of water being evaporated.

A first input of a second steam generator (SG-1$b$) is connected to a first output of the first steam generator (SG-1$a$), a second input is connected to a second output of the first steam generator (SG-1$a$), a first input of a third steam generator (SG-1$c$), is connected to a first output of the second steam generator (SG-1$b$), a second input is connected to a second output of the second steam generator, a first output of (SG-1$c$) is an exhaust port, and a second output of (SG-1$c$) is connected to an input of the $CO_2$ gas purification stage. Each of the plurality of steam generators has a third input connected to an output of a first condenser 122 located between the third input and the steam turbine electrical power generator 110.

The steam turbine electrical power generator 110 comprises a plurality of steam turbine electrical generators (TG-2, TG-3, TG-4).

A first steam turbine electrical generator (TG-2) includes an input connected to a second output of the second heat exchanger (HE-2), a steam exhaust output connected to a fourth input of the second steam generator (SG-1$b$), and a second electrical output connector 103. A second steam turbine electrical generator (TG-3) has an input connected to a third output of the second steam generator, and a third electrical output connector 105. A third steam turbine electrical generator (TG-4) has an input connected to a third output of a third steam generator, a steam exhaust output connected to first condenser, and a fourth electrical output connector 107.

Each steam turbine electrical generator receives pressurized steam from one of the steam generators, which turns blades within a steam turbine, rotating a shaft and generating electricity as described above with respect to the gas turbine generator. The pressure of the steam is lowered by turning the turbine blades and the lower pressure steam is exhausted to the next steam generator.

The input of the first steam turbine electrical power generator (TG-2) receives high pressure steam from the second heat exchanger (HE-2), the input of the second steam turbine electrical power generator (TG-3) receives intermediate pressure steam from the second steam generator (SG-1b), and the input of the third steam turbine electrical power generator (TG-4) receives low pressure steam from the third steam generator (SG-1c). The high pressure steam is in the range of 60-80 bar, preferably 78.2 bar, the intermediate pressure steam is in the range of 10-25 bar, preferably 18.4 bar and the low pressure steam is in the range of 1-5 bar, preferably 1.8 bar.

The $CO_2$ gas purification stage includes at least one second condenser (CS) (123a, 123b, 123c) and at least one second compressor (CP-2, CP-3). The at least one second condenser is configured to receive gas comprising water and $CO_2$ from the second output of the third steam generator, remove the water by condensation from the gas, and output pure $CO_2$. A series of condensers (CS) and compressors (CP-2, CP-3) propel the $CO_2$ as output to storage. Water from the condensers is collected and reused in the steam generators.

The feed source of diesel fuel and the oxygen source are each connected to adjustable valve configured to control the percentage of gas emitted from each source.

A controller is included which has circuitry configured to control each adjustable valve and each compressor and monitor the electrical output to cause the diesel fueled chemical-looping combustion (CLC) electrical power generation system to generate electricity, recover CO2 and emit clean flue gases.

The second embodiment is illustrated with respect to FIG. 1. The second embodiment describes a diesel fueled chemical-looping combustion (CLC) electrical power generation method, which comprises heating, by heat from a heat recovery unit 112, diesel fuel combined with oxygen, separating, by a first gasification reactor 104, the heated diesel fuel into a gaseous element stream including at least H2, $CO_2$, $H_2O$, $CH_4$ and coke, splitting the gaseous element stream into a first stream and a second stream. The system includes separating, by chemical looping combustion, the $CO_2$ and $H_2O$ of the first stream from solid components, combusting, by a combustor (CB), the second stream, then converting, by a gas turbine electrical generator (TG-1), the combusted second stream to electricity and a first exhaust stream. The system further operates by recovering heat, by a heat recovery unit 112, from the $CO_2$ and the $H_2O$ of the first stream and from the first exhaust stream.

The method further includes outputting, by the heat recovery unit 112, a cooled exhaust stream comprising $CO_2$ and $H_2O$. The heat recovery unit further includes converting, by at least one steam generator (SG-1a, SG-1b, SG-1c), the recovered heat and $H_2O$ to steam.

The method further generates electricity, by at least one steam turbine electrical power generator (TG-2, TG-3, TG-4), from the steam.

The method continues by separating, by at least one condenser of a $CO_2$ gas purification stage 120, the $CO_2$ from $H_2O$ of the cooled exhaust stream; and storing the $CO_2$.

Separating by chemical looping combustion further comprises combining the H2, $CO_2$, $H_2O$, $CH_4$ and coke of the first stream with oxygen, reducing, by at least one reduction reactor comprising nickel (Ni) on an alumina ($Al_2O_3$) support, the oxygenated first stream into $H_2O$, $O_2$, $N_2$, $CO_2$, reduced Ni and coke, combusting the $O_2$ and $N_2$ in the combustor (CB), splitting the coke and reduced Ni from the $H_2O$ and $CO_2$, and sending the $H_2O$ and $CO_2$ to the heat recovery unit.

The second embodiment further includes adjusting, by a controller having circuitry configured to control the system, the percentage of gas emitted from each splitter, the percentage of gas emitted from the feed source of diesel fuel and the percentage of oxygen emitted from the oxygen source and to monitor the electrical output, to generate electricity, recover CO2 and emit clean flue gases.

Evaluation of the performance of the power generation unit to facilitate the integrated gasification of diesel and chemical looping combustion with an in-situ and efficient $CO_2$ capture is addressed. 10-100 μm oxygen carrier particles were circulated between the fuel and air reactors of the CLC process. Thus, the influence of mass and heat transfer limitations on the process is negligible. A Peng-Robinson thermodynamic model was applied in the simulation given as the model is suitable for thermodynamic predictions of the system with hydrocarbon and light gases including $H_2$, CO, $N_2$, etc. (See Antzara, A., Heracleous, E., Bukur, D., Lemonidou, A. "Thermodynamic analysis of hydrogen production via chemical looping steam methane reforming coupled with in situ CO2 capture". International Journal of Greenhouse Gas Control. 2015; 32:115-28, incorporated herein by reference in its entirety).

A stream class was used to accommodate the various types of substances including diesel, char and gaseous products as a nonconventional, cissoid and conventional elements, respectively. In a non-limiting example, a simulator was a plant-wide simulation program known as the Aspen Plus™ available from Aspen Technology, Inc., 20 Crosby Drive, Bedford, Mass. 01730, USA, and the stream class was called the MIXCINC stream class.

The Ni-based oxygen carriers and the $Al_2O_3$ supports were classified as solid elements. Table 2 displays the operating conditions of the integrated CLC system. The simplification of the model has been made with the following assumptions:
1. $N_2$ and $Al_2O_3$ are inert constituents.
2. The equipment and transfer line were properly maintained, which resulted with a minor effect of pressure drop and thermo-fluid dynamic on the system.
3. The oxidation reactor (R-1), reduction reactor (R-2), and gasification reactor (R-3) run at high temperatures (>900° C.), and the oxygen carrier particles are very small 10-100 μm. Consequently, those reactors run at equilibrium conditions.
4. In order to maintain the consistency, the system is adiabatic with a single diesel type.

TABLE 2

| Operating conditions of the integrated CLC system | |
|---|---|
| Air supply | 25° C., 1 atm |
| Diesel supply | 25° C., 10 atm |
| Oxygen supply for gasification | 25° C., 10 atm |
| Leakage in the air compressor | 0.8% of inlet flow rate |
| Compressors' polytropic efficiency | 90% |
| Turbine isentropic efficiency | 93% |
| Approach temperature | 25° C. |
| Steam generation pressure level | 1.8 bar, 18.4 bar, 78.2 bar |
| Condenser pressure | 0.05 bar |
| Generator efficiency | 99% |
| $CO_2$ compressor isentropic efficiency | 85% |

TABLE 2-continued

Operating conditions of the integrated CLC system

| | |
|---|---|
| $CO_2$ compressor mechanical efficiency | 96% |
| $CO_2$ compressor electrical efficiency | 96% |
| $CO_2$ storage | 30° C., 85 bar |

Figure 2:
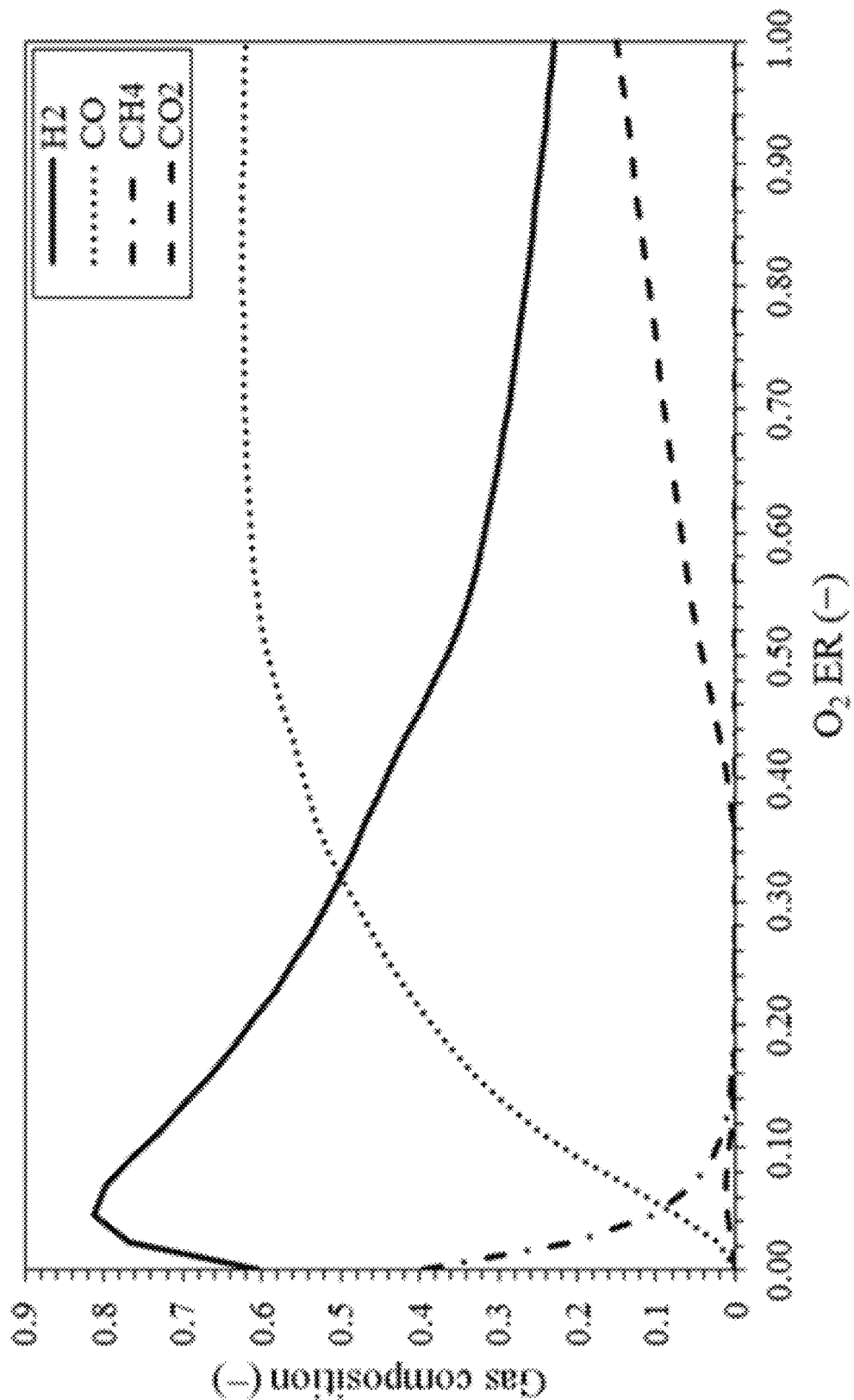
FIG. 2 is a graph illustrating the component distribution of syngas at different $O_2$ exergy ratios.

The purpose of the gasification process is to convert liquid diesel fuel into a gaseous product, called syngas, which primarily consists of $H_2$ and CO. Gasification runs at a high temperatures (>1500° C.) due to the exothermicity of the partial oxidation reaction. In addition, the fuel is preheated in the HE-1 prior to R-3. The assumption is made that the given gasification condition is at equilibrium. Therefore, a Gibbs free energy minimization method is a suitable approach to predict the performance of R-3. Under these considerations, R-3 is modelled using two consecutive blocks: RYield and RGibbs in the simulator. RYield converts the liquid diesel that is unrecognized and a nonconventional element into common constituents including C, H and O according to the elemental balance. Then, the RYield products are directed to the RGibbs to react with oxygen according to the Gibbs minimization method. The presence of oxygen in R-3, which is typically quantified as the oxygen equivalence ratio ($O_2$ ER), has a significant influence on the product distribution, as depicted in FIG. 2. $O_2$ ER refers to the molar ratio of the actual amounts of $O_2$ to the stoichiometric amount of $O_2$ required for complete combustion. Identical behavior was also found in both experiments and simulations. (See Susanto H, Beenackers A. "A moving-bed gasifier with internal recycle of pyrolysis gas". Fuel. 1996, Vol. 75, pp. 1339-1347; Qadi N M N, Hidayat A, Takahashi F, Yoshikawa K. "Co-gasification kinetics of coal char and algae char under CO2 atmosphere". Biofuels. 2017, Vol. 8, pp. 281-289; Adnan et al. (2018); Hajjaji N, Pons M-N, Houas A, Renaudin V. "Exergy analysis: An efficient tool for understanding and improving hydrogen production via the steam methane reforming process". Energy Policy. 2012, Vol. 42, pp. 392-399; and Chen Z, Zhang X, Han W, Gao L, Li S. "Exergy analysis on the process with integrated supercritical water gasification of coal and syngas separation". Applied Thermal Engineering. 2018, Vol. 128, pp. 1003-1008, each incorporated herein by reference in their entirety). An $O_2$ ER of 0.37 is selected for all simulations in order to minimize the formation a carbon deposit. High-purity $O_2$ (95% $O_2$, 5% $N_2$) is employed as the gasifying agent due to its ability to provide high operation temperatures, as higher temperatures result in a higher fuel conversion.

The chemical looping combustion, CLC, stage 108 is primarily responsible for the $CO_2$ capture in the present system. In the CLC, the combustible gases from R-3 are completely oxidized by nickel oxide instead of air to avoid the $N_2$ dilution effect of the flue gas. Consequently, the flue (exhaust) gas mainly consists of $CO_2$ and $H_2O$. $H_2O$ can be easily removed by condensation leaving high-purity $CO_2$. 100% excess nickel oxide is used to ensure complete oxidation at R-2. The exothermic oxidation reaction at R-2 provides a high operating temperature stream and R-2 runs at equilibrium.

The heat recovery system 112 consists of a set of heat exchangers (SG-1) to utilize the exhaust gas from the CLC process and from TG-1 to generate steam at three different pressures: high pressure steam (78.2 bar), intermediate pressure steam (18.4 bar) and low pressure steam (1.8 bar). The steam from the heat recovery system 112 is directed to the steam turbine generators (TG-2, TG-3, and TG-4) to produce electricity. The exhaust temperature at the outlet (see "To atmosphere", FIG. 1) after heat recovery is around 140° C.

The steam turbine generator 110 converts steam (from the heat recovery unit) into electricity by facilitating three consecutive gas turbine generators, TG-2, TG-3, and TG-4 for high pressure steam, intermediate pressure steam and low-pressure steam, respectively. The outlet of TG-4 is condensed and recirculated to the heat recovery unit.

The gas turbine generator 106 consists of a single apparatus (i.e., TG-1), which generates electricity by extracting energy from the exhaust gas from the combustion chamber (CB). This unit is essential for its contribution in ameliorating the limitation of electricity production due to the operating temperature of R-1, as it occurs in the conventional CLC. The presence of the combustion chamber, CB, prior to TG-1 significantly elevates the inlet temperature of TG-1, resulting in a higher production of electricity.

The exergy of a system describes the maximum obtainable amount of work that brings a system into equilibrium with its surroundings, which is chosen as the reference. The exergy of a material is calculated based on the summation of various exergy forms including kinetic, potential and internal exergy. For the purpose of the analysis, the following assumptions are made: (1) the kinetic and potential exergy are negligible and (2) there is no heat loss or pressure drop throughout the pipelines. Thus, the total exergy ($\varepsilon_{tot}$) is solely the internal exergy which consists of physical exergy ($\varepsilon_{py}$) and chemical exergy ($\varepsilon_{ch}$).

$$\varepsilon_{tot} = \varepsilon_{py} + \varepsilon_{ch} \tag{7}$$

The physical exergy corresponds to the amount of the usable energy in the stream without chemical reaction. This term is a function of enthalpy and entropy, as shown in the following equation:

$$\varepsilon_{py} = (h - h_0) - T_0(s - s_0) \tag{8}$$

where, h and s represent the enthalpy and entropy of the stream at the given conditions, respectively, while $h_0$ and $s_0$ are the same properties at the reference condition.

The chemical exergy is the amount of energy obtained from a substance relative to its reference condition. The chemical exergy is calculated using the equation below:

$$\varepsilon_{ch} = \sum_i y_i \varepsilon_{sb,i} + RT_0 \sum_i y_i \ln(y_i) \tag{9}$$

where, $y_i$ and $\varepsilon_{sb,i}$ are the mole fraction and molar chemical exergy of substance i, respectively. R denotes the ideal gas constant. $T_0$ represents the reference temperature. The molar chemical exergy is obtained from the reference. (See Szargut J, Morris D R, Steward F R. Exergy analysis of thermal, chemical, and metallurgical processes: Hemisphere; 1988, incorporated herein by reference in its entirety). The exergy of diesel at the reference state is equal to the lower heating value.

The goal of this integrated process is to generate electricity with minimum $CO_2$ emissions. Therefore, the key performance of the process was quantified using the net electrical efficiency, exergy efficiency and specific $CO_2$ emission. The net electrical efficiency is the ratio of the amount of electric energy from the power generation system to sum the heating value of diesel and respective consumed energies for the process (i.e., $O_2$ purification for gasification, air compression, and $CO_2$ compression).

$$\eta_{el} = \frac{\xi_{el} - \xi_{co}}{m_{df} LHV_{df}} \quad (10)$$

where, $\eta_{el}$ represents the net electrical efficiency; $E_{el}$ denotes the amount of generated electricity from the power generation units, $kJ \cdot s^{-1}$; $E_{co}$ designates the consumed energy by the process, $kJ \cdot s_{-1}$; $m_{df}$ means the mass flow rate of the diesel fuel, $LHV_{df}$ symbolizes the low heating value of the diesel fuel. $\xi_{el}$ and $\xi_{co}$ are quantified using the following equations:

$$\xi_{el} = \xi_{TG-1} + \xi_{TG-2} + \xi_{TG-3} + \xi_{TG-4} \quad (11)$$

$$\varepsilon_{co} = \varepsilon_{cp-1} + \varepsilon_{cp-2} + \varepsilon_{cp-3} + \varepsilon_{o2} + \varepsilon_{aX} \quad (12)$$

where, $\varepsilon_{el}$ is sum of amount electricity generated by the gas turbine generator (TG-1) and steam turbine generators (TG-2, TG-3, and TG-4), which are denoted as $\varepsilon_{TG-1}$, $\varepsilon_{TG-2}$, $\varepsilon_{TG-3}$, and $\varepsilon_{TG-4}$, respectively. $\varepsilon_{co}$ represents the total amount of energy consumption by the air compressor (CP-1), $CO_2$ compressor $1^{st}$ stage (CP-2), $CO_2$ compressor $2^{nd}$ stage (CP-3), $O_2$ purification and auxiliaries, which are assigned as $\varepsilon_{cp-1}$, $\varepsilon_{cp-2}$, $\varepsilon_{cp-3}$, and $\varepsilon_{ax}$, respectively. The energy produced or used by turbines or compressor is predicted using the following equation:

$$\xi = RZ_{avg} T_{avg} \ln\left(\frac{P_{out}}{P}\right) \quad (13)$$

where, R denotes the gas constant. $Z_{avg}$ and $T_{avg}$ represent the average compressibility factor and temperature between the inlet and outlet streams, respectively. Pin is the inlet pressure and $P_{out}$ is the outlet pressure. Compressibility factor, usually defined as Z=pV/RT, is unity for an ideal gas. The compressibility factor (Z), also known as the compression factor or the gas deviation factor, is a correction factor which describes the deviation of a real gas from ideal gas behavior. It is simply defined as the ratio of the molar volume of a gas to the molar volume of an ideal gas at the same temperature and pressure. The compressibility factor may be obtained from a compressibility factor chart. (See "PETE310", "Real Gases", pp. 1-27, Mar. 10, 2016, http://www.pe.tamu.edu/barrufet/public_html/PETE310/pdf/L10-Real %20Gases.pdf, incorporated herein by reference in its entirety.).

The performance of the process was also investigated using an exergy balance. As discussed above, there are four primary units. Therefore, the integrated process consists of four main systems. In the exergy balance, the term "destroyed exergy" is defined as the decrease in the energy quality by considering both the amount and direction of energy. This term is absent in the energy balance given it only applies to energy conservation regardless the energy direction. (See Tsatsaronis G. "Thermoeconomic analysis and optimization of energy systems". Prog Energy Combust Sci. 1993, Vol. 19, pp. 227-257, incorporated herein by reference in its entirety). The exergy destruction within the system is given by the following equation:

$$\varepsilon_{ds,n} = \Sigma_i \varepsilon_{tot,i}^{in,n} - \Sigma_i \varepsilon_{tot,i}^{out,n} \quad (14)$$

where, $\varepsilon_{ds,n}$ is the total destroyed exergy of the system n. $\varepsilon_{tot,i}^{in}$ and $\varepsilon_{tot,i}^{out}$ are the total exergy of species i in the inlet stream and outlet of system n, respectively. Based on the exergy destruction, the equation for calculation of exergy efficiency is as follows:

$$\eta_{ex,n} = 1 - \frac{\varepsilon_{ds,n}}{\varepsilon_{tot}^{in,n}} \quad (15)$$

where, $\eta_{ex,n}$ is the exergy efficiency of system n and $\varepsilon_{tot}^{in,n}$ is the total exergy of the inlet stream to system n. The contribution of each unit in the exergy destruction ($C'_n$) is also determined.

$$\dot{C}_n = \frac{\varepsilon_{ds,n}}{\sum_n \varepsilon_{ds,n}} \quad (16)$$

The simulation is run at the identical operating condition and fuel as conducted by Consonni et al. (See Consonni S, Lozza G, Pelliccia G, Rossini S, Saviano F. "Chemical-Looping Combustion for Combined Cycles With $CO_2$ Capture". Journal of Engineering for Gas Turbines and Power. 2006, Vol. 128, pp. 525-534, incorporated herein by reference in its entirety).

The model is validated by comparing the temperature and composition of both oxidation reactor (R-1) and reduction reactor (R-2). In addition, the comparison of the net electrical efficiency is presented including the breakdown of power consumption and power production. For validation, a 10 kg/s natural gas at 15° C. and 20 bar, with the following compositions: 92% $CH_4$, 3.2% $C_2H_6$, 1.1% $C_3H_8$, 0.3% $CO_2$, 3.3% $N_2$ and 0.1% $C_4H_{10}$, is directed to R-2. Table 3 summarizes the temperatures, mass flow rate and composition of R-1 and R-2 products. Table 3 clearly shows that the results obtained from the analysis agree closely with the corresponding values reported by Consonni et al. The same conclusion may also be observed in Table 4, showing the breakdown of power consumption and power production in the power generation system. In the simulation, the electricity production of the steam turbine is considerably lower than its counterpart obtained by Consonni et al. shown in Table 4. Consonni et al. considered the output of high pressure steam turbine as 1 atm, which is unfeasible given it should be used for intermediate pressure steam turbine, as steam at 1 atm is considered as a dead state in the exergy analysis. Thus, in the present disclosure, the output pressure of high-pressure steam turbine is connected to the intermediate pressure steam turbine. The power output of steam turbine matches that obtained by Consonni et al when the output of the high-pressure steam turbine is one atm. A separate boiler was used to generate steam, which meets the requirements of the intermediate pressure steam turbine.

TABLE 3

Key parameters for R-1 and R-2

| | R-1 products | | R-2 products | |
|---|---|---|---|---|
| Components | Consonni | Present disclosure | Consonni | Present disclosure |
| Solids | | | | |
| Mass flow, kg/s | 2507 | 2507 | 2470 | 2470 |

TABLE 3-continued

Key parameters for R-1 and R-2

| | R-1 products | | R-2 products | |
|---|---|---|---|---|
| Components | Consonni | Present disclosure | Consonni | Present disclosure |
| Temp. °C. | 1050 | 999 | 986.2 | 997 |
| Reduced iron, % wt | 0 | 0 | 43.6% | 43.9% |
| Oxidized iron, % wt | 50.8% | 50.7% | 6.5% | 6.1% |
| Inert material, % wt | 49.2% | 49.3% | 50.0% | 50.0% |
| Gases | | | | |
| Mass flow, kg/s | 474.8 | 437.7 | 47.2 | 47.4 |
| Temp. °C. | 1050 | 999 | 986.2 | 997 |
| $N_2$, % mol | 82.70% | 84.99% | 1.09% | 1.07% |
| $O_2$, % mol | 15.18% | 15.01% | 0.00% | 0.00% |
| Ar, % mol | 0.98% | 0.00% | 0.00% | 0.00% |
| $H_2O$, % mol | 1.11% | 0.00% | 65.25% | 65.17% |
| $CO_2$, % mol | 0.03% | 0.00% | 33.64% | 33.75% |

TABLE 4

Comparison of power generation systems

| | Items | |
|---|---|---|
| Power output, MW | Consonni | Present disclosure |
| Gas turbine | 111.1 | 118.7 |
| Steam turbine | 98.6 | 48.7 |
| $CO_2$ compressor, MW | −4.8 | −5.2 |
| Auxiliaries | −3.3 | −2.5 |
| Net power output | 201.6 | 159.8 |
| Natural gas fuel input, $MW_{LHV}$ | 467.1 | 467.1 |
| Net efficiency | 43.2% | 34.2% |

An evaluation was performed for two parameters: (1) oxidation air and (2) pressure ratio at different split ratios (SR).

Split ratio is the molar ratio of the syngas for supplying CB, to the syngas for R-2. A discussion of the parametric investigation is presented below.

Oxidation air refers to the air injected to R-1 to re-oxidize the reduced (in the fuel reactor) oxygen carrier (Ni/$Al_2O_3$). For parametric experimentation, various ASF ratios are used to identify the effect of oxidation air on the system performance. The ASF ratio refers to the ratio of the actual air to the stoichiometric air needed for complete oxidation of the reduced metal. In this section, a single pressure ratio (PR ratio) of 10 is employed for all simulations. The PR ratio is applied for the main units i.e., R-1, R-2 and R-3. The PR ratio defines the ratio of the operating pressures in the main units (i.e., the gasification unit and the CLC unit) to the atmospheric pressure. Note that in FIG. 3 the ASF ratio has an optimum value between 4 and 6, which positively correlates to the electrical efficiency. Further increase of the ASF ratio reduces the electrical efficiency. For instance, at an SR of 0.0 (no syngas directed to CB), the electrical efficiency increases from 27% to 31% when the ASF ratio increases from 2 to 4. When the ASF ratio is increased 4 to 6, no significant change is observed in electrical efficiency. The electrical efficiency remains at 31%. Further increase in the ASF ratio (above 6) results in an adverse effect on the electrical efficiency, which drops from 31% to 24% as the ASF ratio increases from 6 to 10. This result can be explained by the fact that the amount of energy extracted by TG-1 is a function of the temperature and the flow rate of flue gas. In addition, it is worth noting that higher air flow rates result in three interconnecting factors: (1) higher energy consumption for air compression, (2) higher flue gas flow rate entering TG-1 and (3) lower flue gas temperatures. At a low ASF ratio, an increase in the air flow rate causes a decrease in flue gas temperature, resulting in higher electricity production in the TG-1. Therefore, the increase of energy required for air compression is lower than the increase of electricity produced by the TG-1, resulting in higher electrical efficiency. At a medium ASF ratio, the increase of the ASF ratio slightly reduces the flue gas temperature. Thus, the energy of air compression is counterbalanced by energy production in TG-1. At a high ASF ratio, the addition of air to R-1 leads to a significant drop of flue gas temperature, which results in low electricity production of TG-1. Consequently, the increase in energy for air compression dominates the total electricity production.

Figure 3:
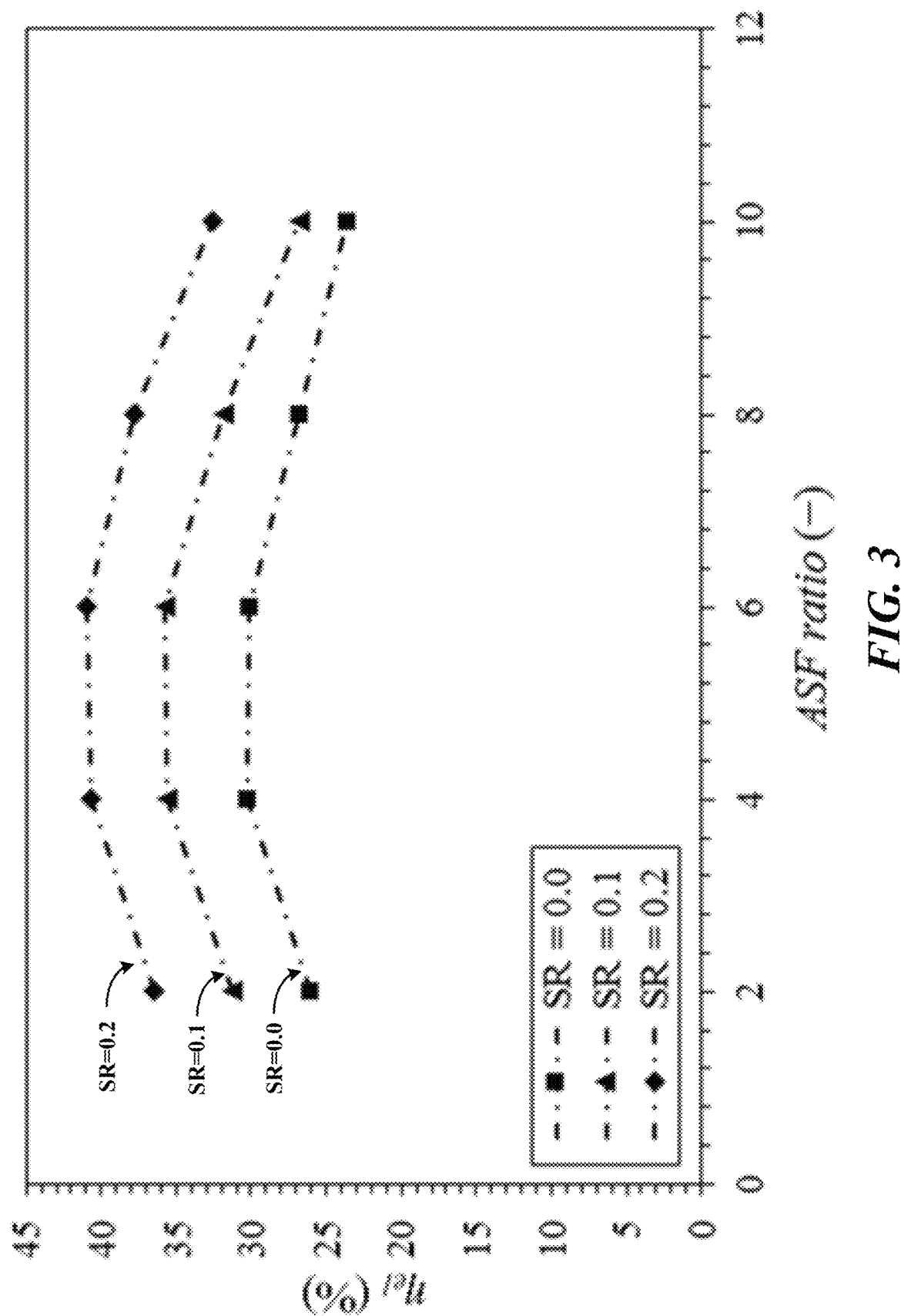
FIG. 3 is a graph illustrating the effect of air to stoichiometric fuel (ASF) ratio on the electrical efficiency at various split ratios (SR)
Figure 4:
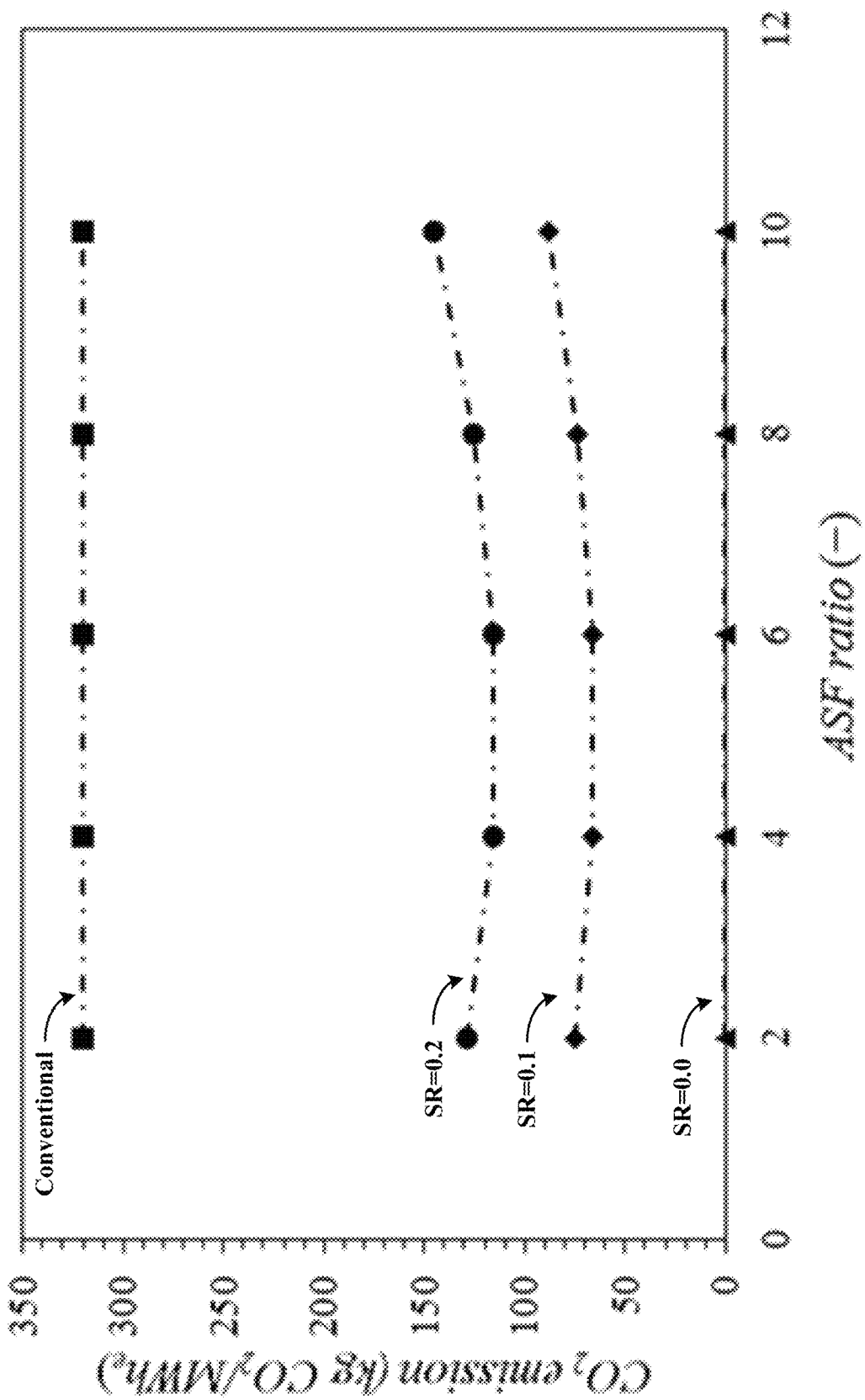
FIG. 4 is a graph illustrating the effect of air to stoichiometric fuel (ASF) ratio on the specific $CO_2$ emission at various split ratios (SR)

A similar result is also observed in the simulation with SR of 0.1 and 0.2 with different magnitudes, as shown in FIG. 3. It is clearly seen from FIG. 3 that increasing the amount of syngas to CB leads to an increase of electrical efficiency, but sacrifices $CO_2$ emission as shown in FIG. 4. For example, at an ASF ratio of 4, electrical efficiency increases from 31% to 37% and 42% as the SR is increased from 0.0 to 0.1 and to 0.2, respectively. Consequently, the specific $CO_2$ emission is increased from 0 to 66 for a 0.1 increase in SR, and to 116 kg/$MWh_e$ for a 0.2 increase in SR, respectively, as shown in FIG. 4. However, this number is still much lower than the typical diesel generator which releases $CO_2$ emissions around 320 to 530 kg $CO_2$/$MWh_e$. (See Dufo-López R, Bernal-Agustin J L, Yusta-Loyo J M, Dominguez-Navarro J A, Ramirez-Rosado I J, Lujano J, et al. "Multi-objective optimization minimizing cost and life cycle emissions of stand-alone PV-wind-diesel systems with batteries storage". Appl Energ. 2011, Vol. 88, pp. 4033-4041, incorporated herein by reference in its entirety). This result is due to the fact that a higher SR results in a higher temperature of flue gas entering TG-1 due to the exothermic combustion reaction in the CB. This is in line with the results reported by Consonni et al. and Adnan et al. using natural gas and fuel oil as the fuel, respectively.

Figure 5:
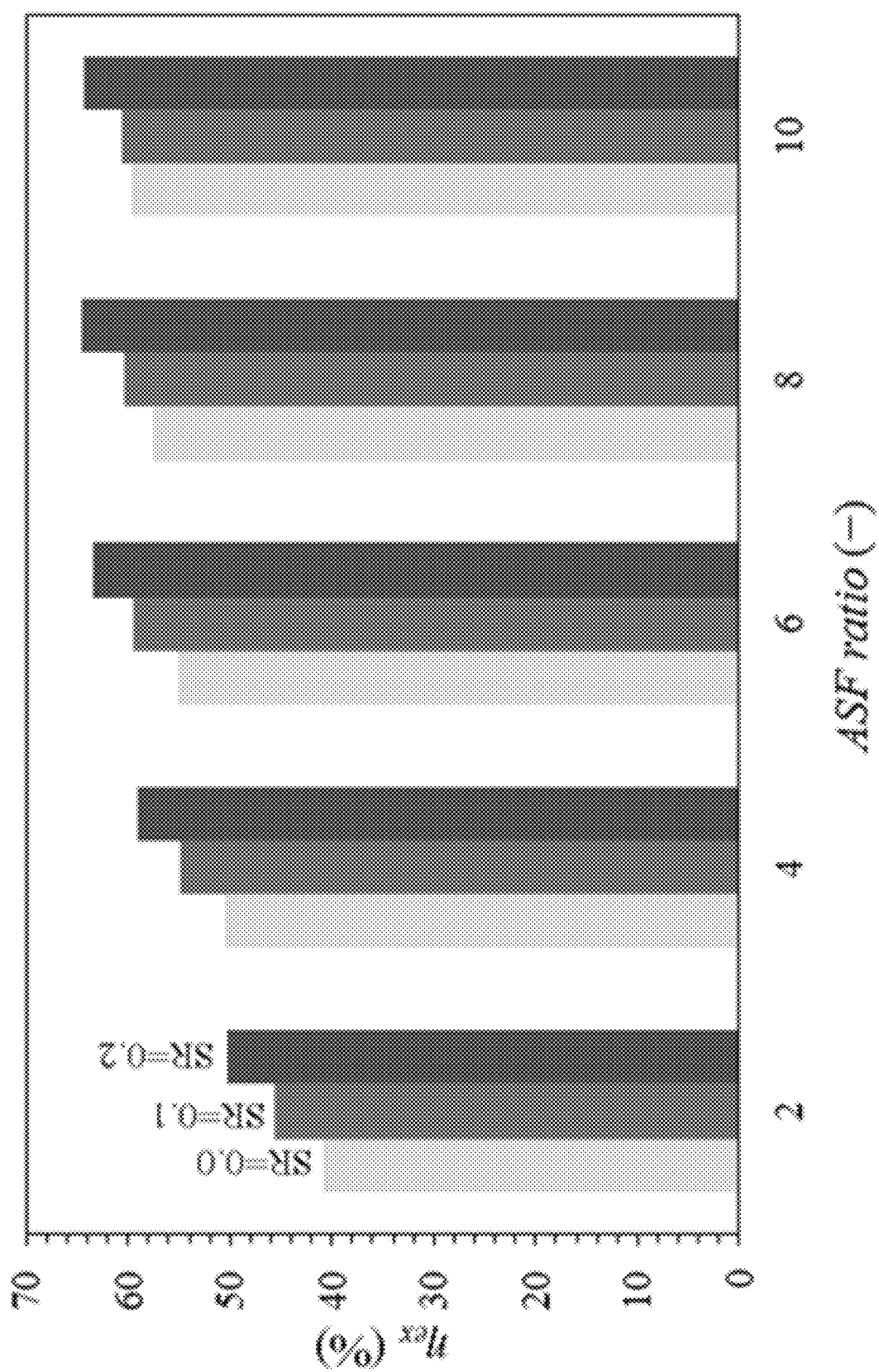
FIG. 5 is a graph illustrating the effect of ASF ratio on the exergy efficiency at various split ratios (SR)
Figure 6A:
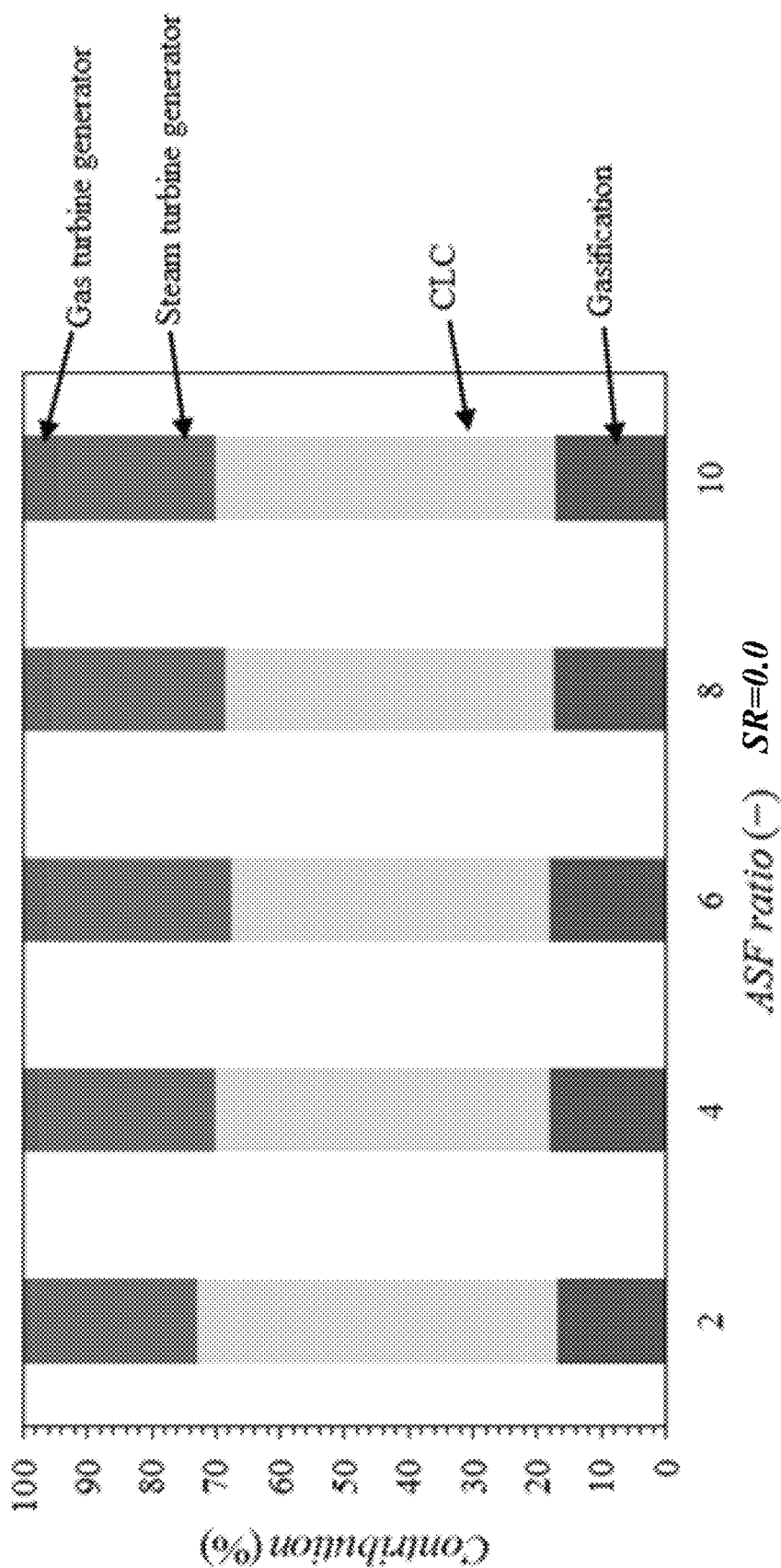
FIGS. 6A-6C are graphs illustrating the contribution of gasification, CLC, steam turbine generator, and gas turbine generator on the exergy destruction at (a) SR=0.0, (b) SR=0.1, and (c) SR=0.2.
Figure 6B:
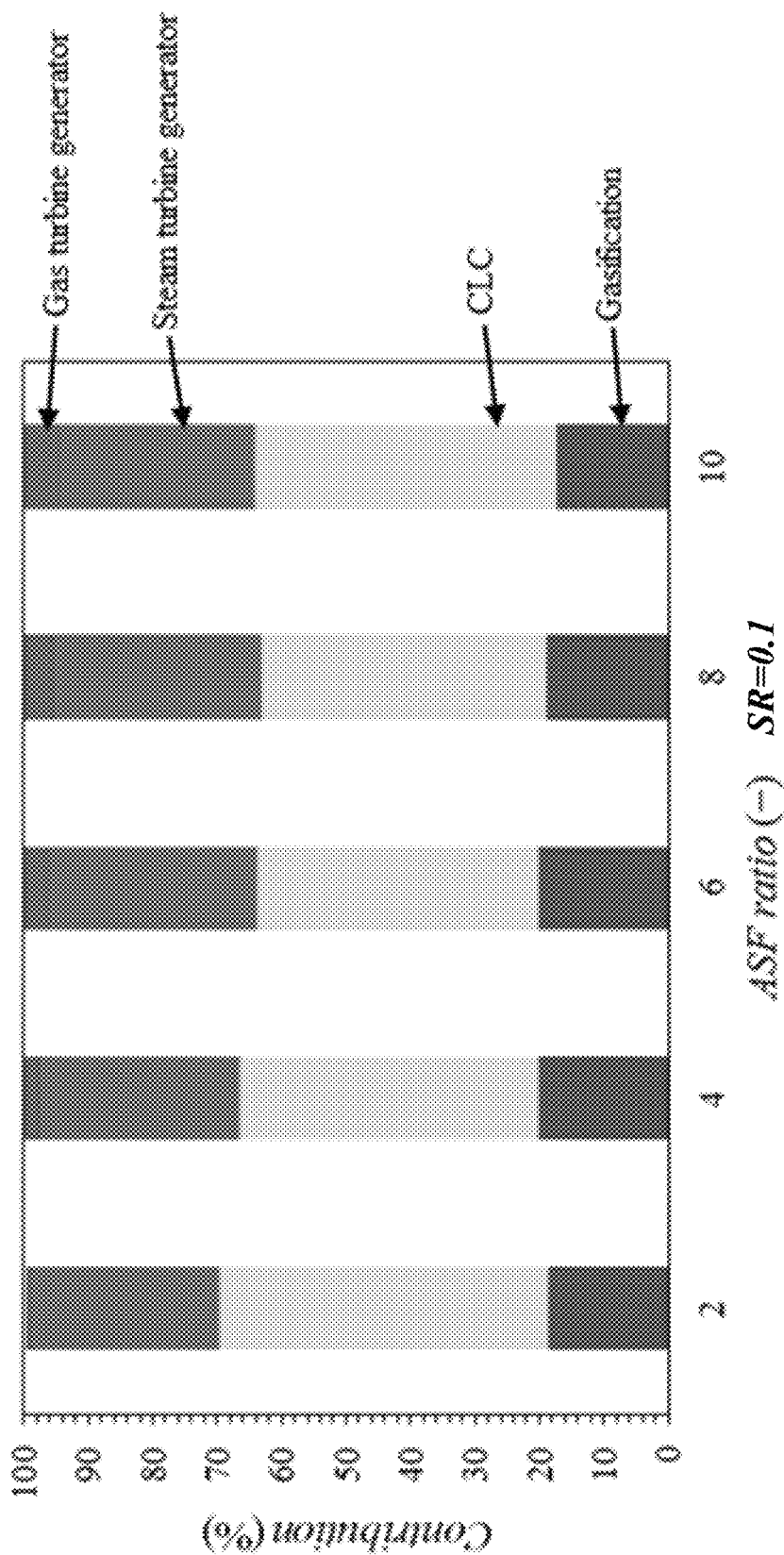
Figure 6C:
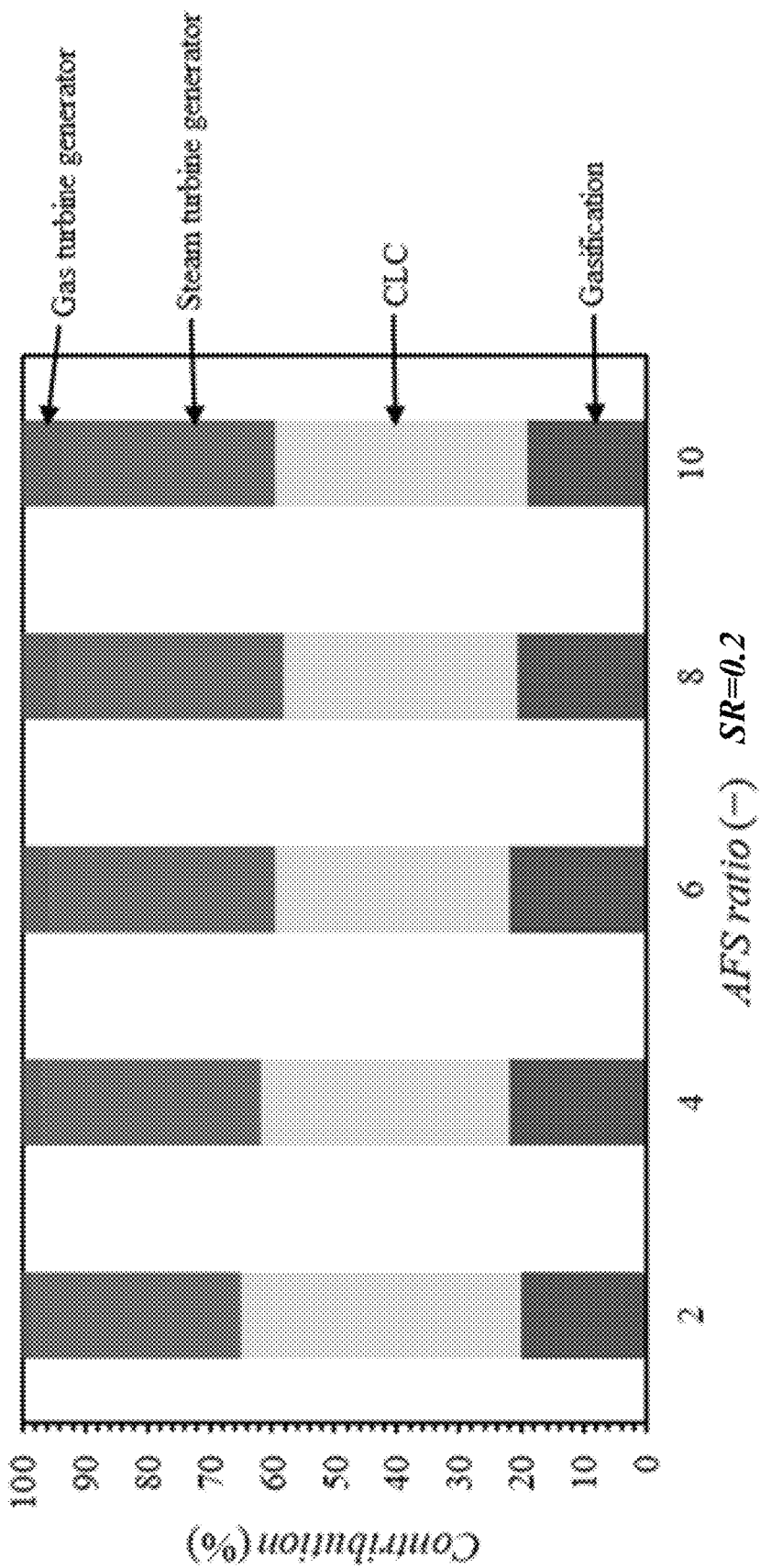

Regarding the exergy analysis, unlike electricity, exergy efficiency of the integrated system increases gradually with increasing ASF ratios, as illustrated in FIG. 5. For instance, the exergy efficiency continuously increases from 41% to 60% with increasing of ASF ratios from 2 to 10. This observation can be explained by the increase of gas flow rates in the CLC system due to the increase of oxidation air supply to R-1, which promotes the exothermic oxidation reaction of reduced Ni (Eq. 6). The CLC unit contributes primarily to the fluctuation in exergy efficiency, as shown in FIG. 6A. A similar trend is also found in the process with SR of 0.1 and 0.2 with higher values of exergy efficiency. The influence of the ASF ratios on exergy efficiency declines at a higher SR. For instance, at the SR of 0, increasing the ASF ratio from 6 to 10 leads to an increase of exergy efficiency from 55% to 60%. At a higher SR (i.e., 0.1) the increase of the ASF ratio at the similar magnitude only increases the exergy efficiency from 59% to 61%. The influence of the ASF ratio on exergy efficiency is minimum at an SR of 0.2, which is reflected by the small increase of exergy efficiency (only by 1%) as the ASF ratio is elevated from 6 to 10. This result indicates that the method of syngas splitting successfully cut-off the dependence of system performance on the temperature of the CLC unit. At a high SR ratio, the temperature of the CB dominates the flue gas entering TG-1 instead of temperature of the R-1 from the CLC unit, resulting in a high production of electric power. This is confirmed by increasing the contribution of the gas turbine generation unit on exergy destruction as the SR is augmented from 0.0 and 0.2 due to a higher production of electric power, as depicted in FIG. 6A-6C.

Figure 7A:
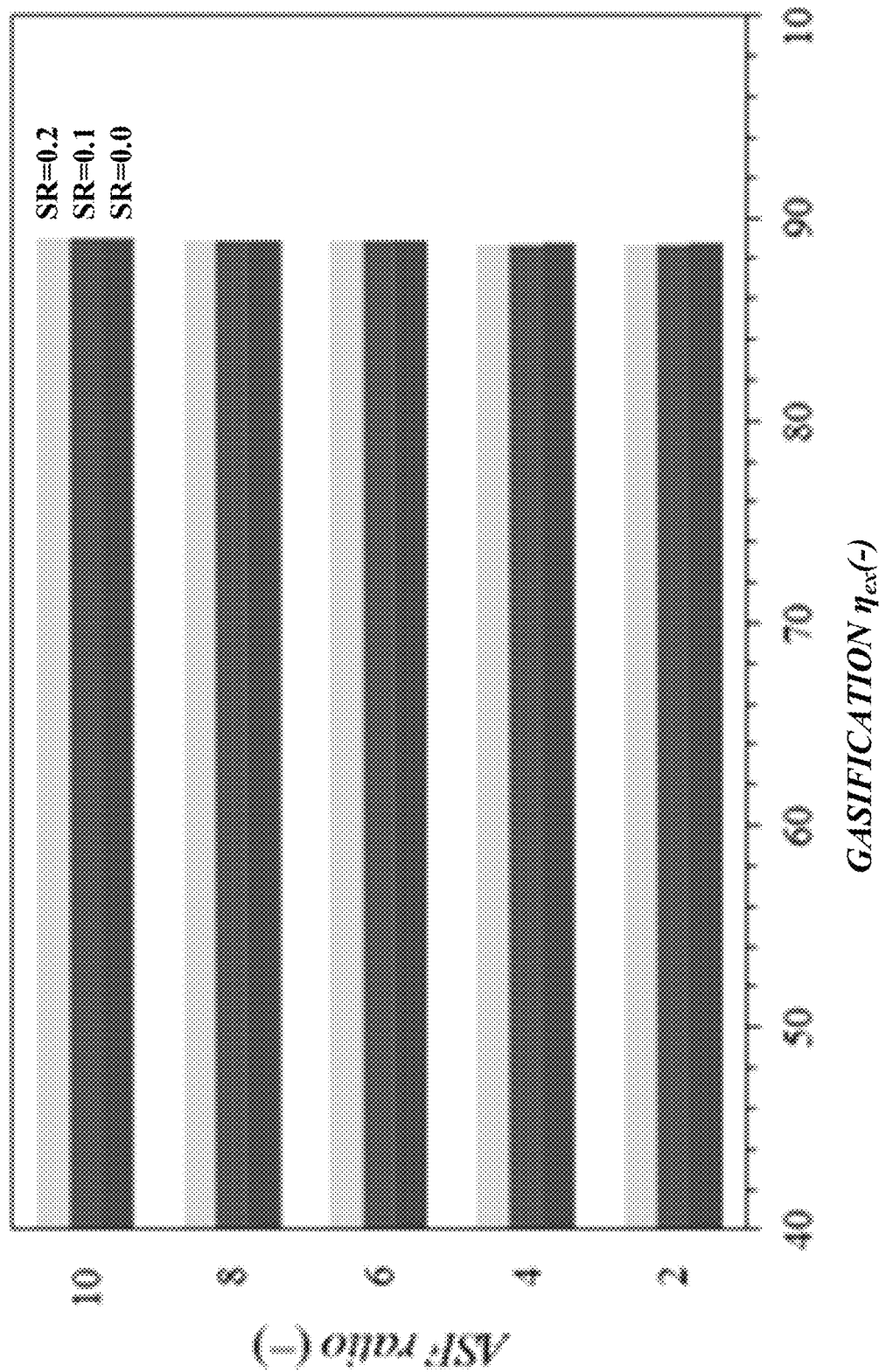
FIGS. 7A-7D are graphs illustrating the effect of ASF ratio on exergy efficiency of (a) gasification process, (b) chemical looping combustion, (c) steam turbine generator, and (d) gas turbine generator at various SRs.
Figure 7B:
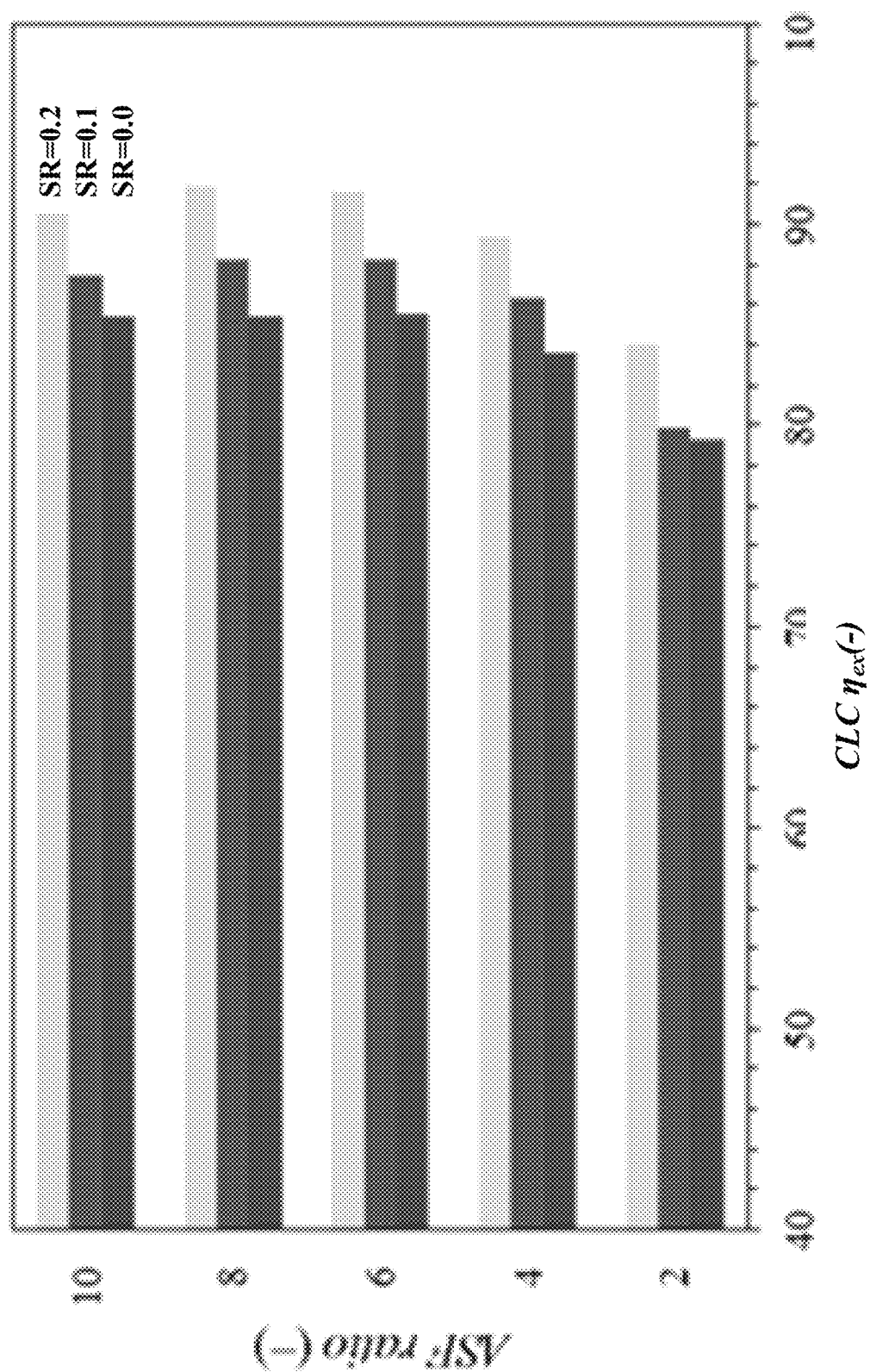
Figure 7C:
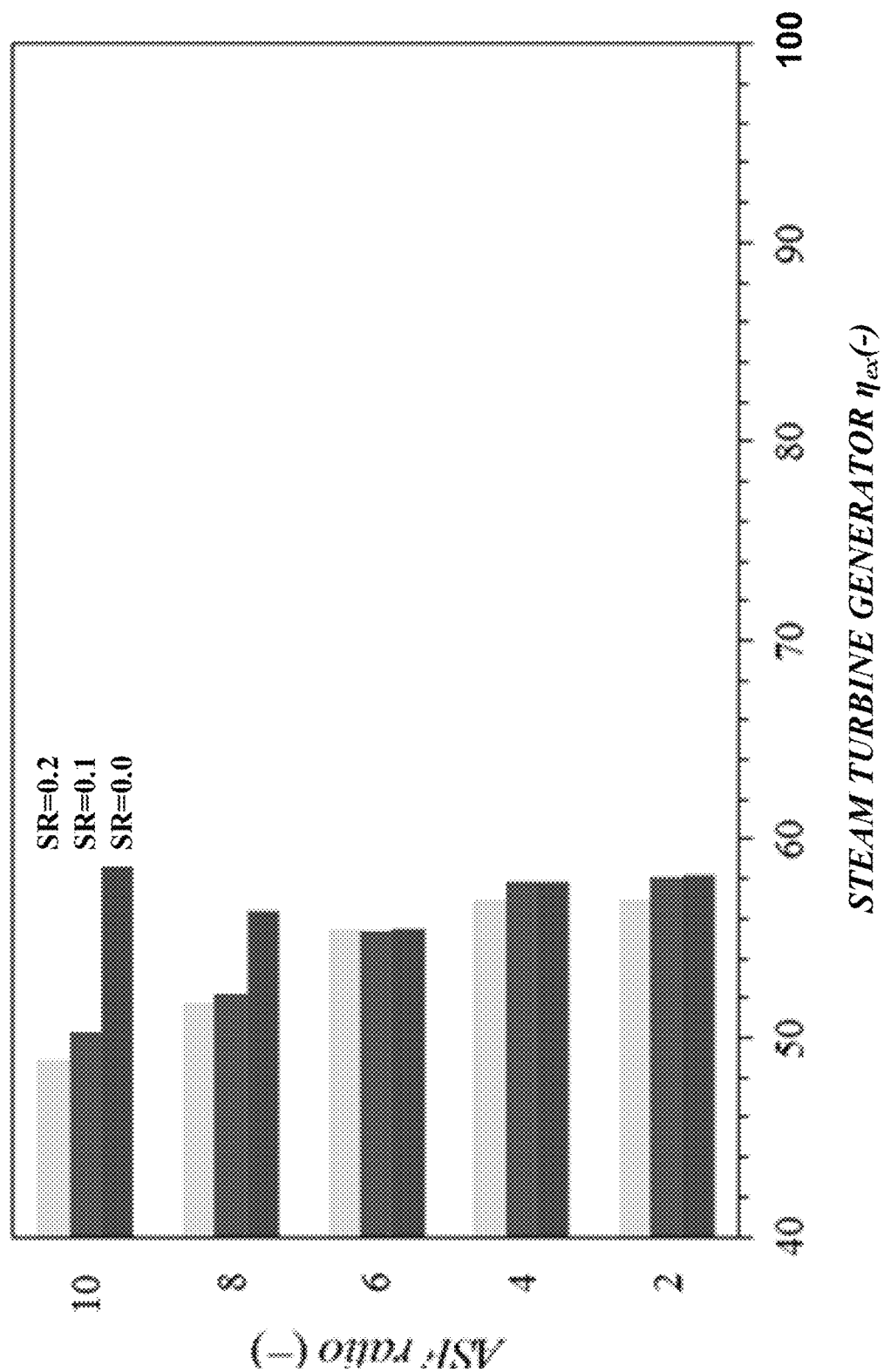
Figure 7D:
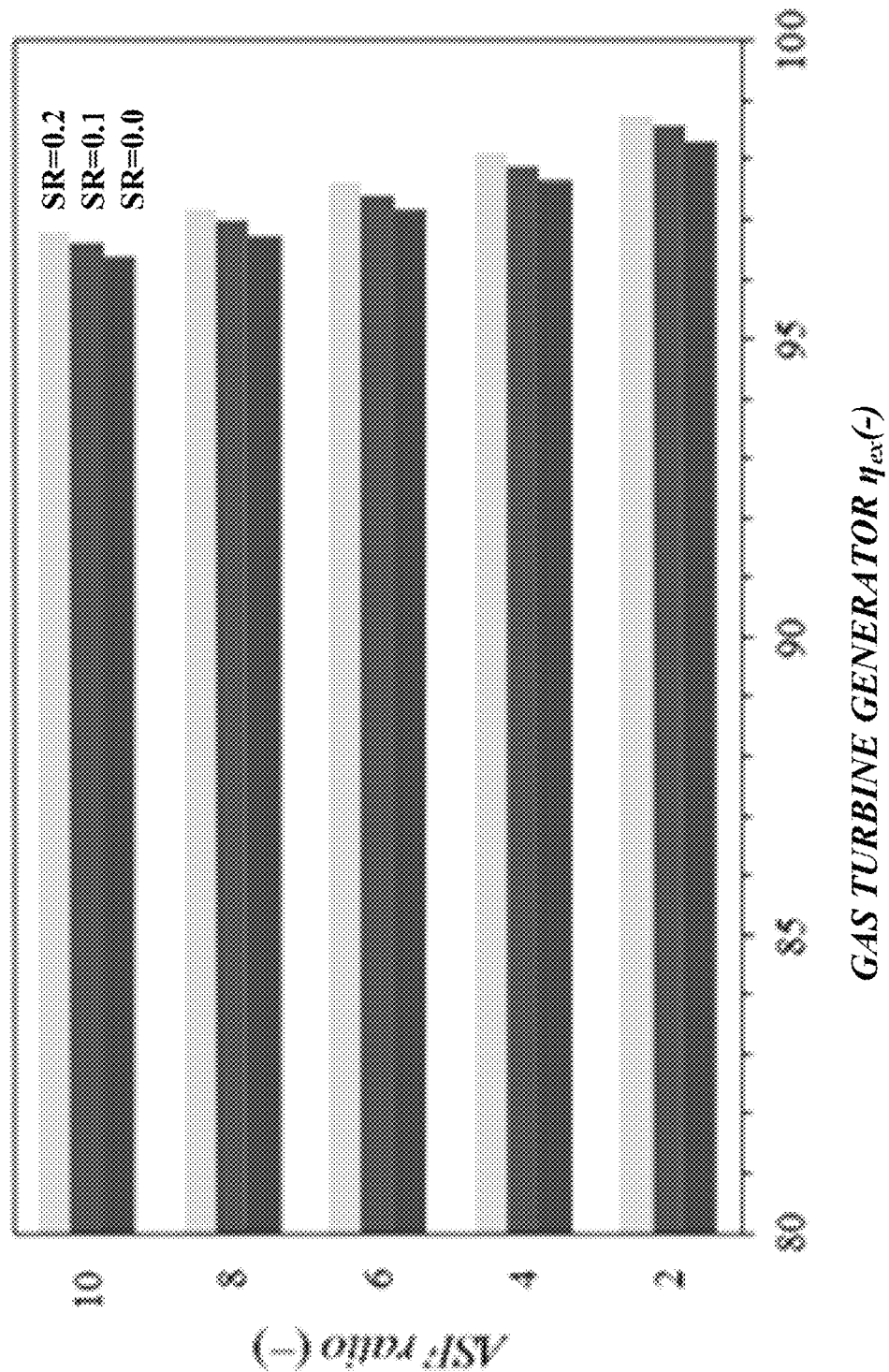

The exergy efficiency of the main units is summarized in FIG. 7A-7D. As shown in FIG. 7A, the ASF ratio and the SR have minimal influence on the exergy efficiency, $\eta_{ex}(-)$, of the gasification unit. This is because the operating parameters of gasification are constant for all the tests. In addition, the energy exchanged in the fuel preheater HE-1 is negligible as compared to the overall energy in the gasification process. It can be clearly seen from FIG. 7B that elevating the ASF ratio from 2 to 6 has a positive influence on CLC exergy efficiency. For instance, at a SR of 0.0, elevating the ASF ratio from 2 to 6 leads to an increase of exergy efficiency from 80% to 86%. This can be explained by the promotion of exothermic oxidation of reduced nickel (Eq. 6) due to a higher air flow rate in the R-1. Consequently, the enthalpy of the gas product elevates due to increasing operating temperatures of R-1 as the ASF ratio is increased from 2 to 6. However, at a high ASF ratio the increase of the ASF ratio slightly declines the exergy efficiency. At a SR of 0.1, the exergy efficiency slightly decreases from 86% to 85% when the ASF ratio is increased from 6 to 10. This result can be explained by the fact that the increase of exergy due to exothermic oxidation reactions (Eq. 6) is counterbalanced by the presence of a large amount of air from ambient which reduces the R-1 temperature, resulting in a slight decline of net exergy. The same trend is also observed on the SR of 0.1 and 0.2 with a higher magnitude, as depicted in FIG. 7B. When the syngas is split in SL-2 to go to the CB, the flow rate of the syngas reactant to the CLC unit decreases. This implies the minimum exergy loss due to heat transfer and mass transfer during the solid-gas reaction. (See Rahbari A, Venkataraman M B, Pye J. "Energy and exergy analysis of concentrated solar supercritical water gasification of algal biomass." Appl Energ. 2018, Vol. 228, pp. 1669-1682, incorporated herein by reference in its entirety). The exergy efficiency of steam generation is shown in FIG. 7C. One can clearly observe that at a SR of 0.0, the increase of the ASF ratio in the range of 2 to 6 has an adverse effect on the exergy efficiency (slightly declines from 58% to 56%), while at a higher range of the ASF ratio (i.e., 6 to 8) the exergy efficiency elevates from 56% to 59%. The reason for this can be attributed to the exergy in the inlet steam generation system as the exergy in the outlet stream is relatively constant with the ASF ratio. As discussed above, the presence of air to the CLC unit can significantly influence the operating temperature. This affects the exergy of the product CLC unit, which then uses hot stream to generate steam for the steam turbine system. Thus, one can conclude that the increase of exergy efficiency when the ASF ratio is elevated from 6 to 8 can be attributed to lower exergy of the inlet stream. The different trend is observed on the simulation with SR of 0.1 and 0.2. The exergy efficiency continuously declines as the ASF ratio is elevated due to the negative impact of air on the temperature of the CLC unit. A similar results is observed for the gas turbine, as depicted in FIG. 7D. As part of the syngas is directed to the CB, the electricity production shifted from the steam turbine generation unit (extracting hot gas from CLC unit) to the gas turbine generation unit (extracting hot gas from CB). Moreover, the temperature of CLC unit declines due to a lower syngas supply. This is confirmed by lower exergy efficiency at a SR of 0.1 when compared to its counterpart at SR of 0.2. FIG. 7D also confirms that a higher SR results in higher exergy efficiency in the gas turbine unit.

Figure 8:
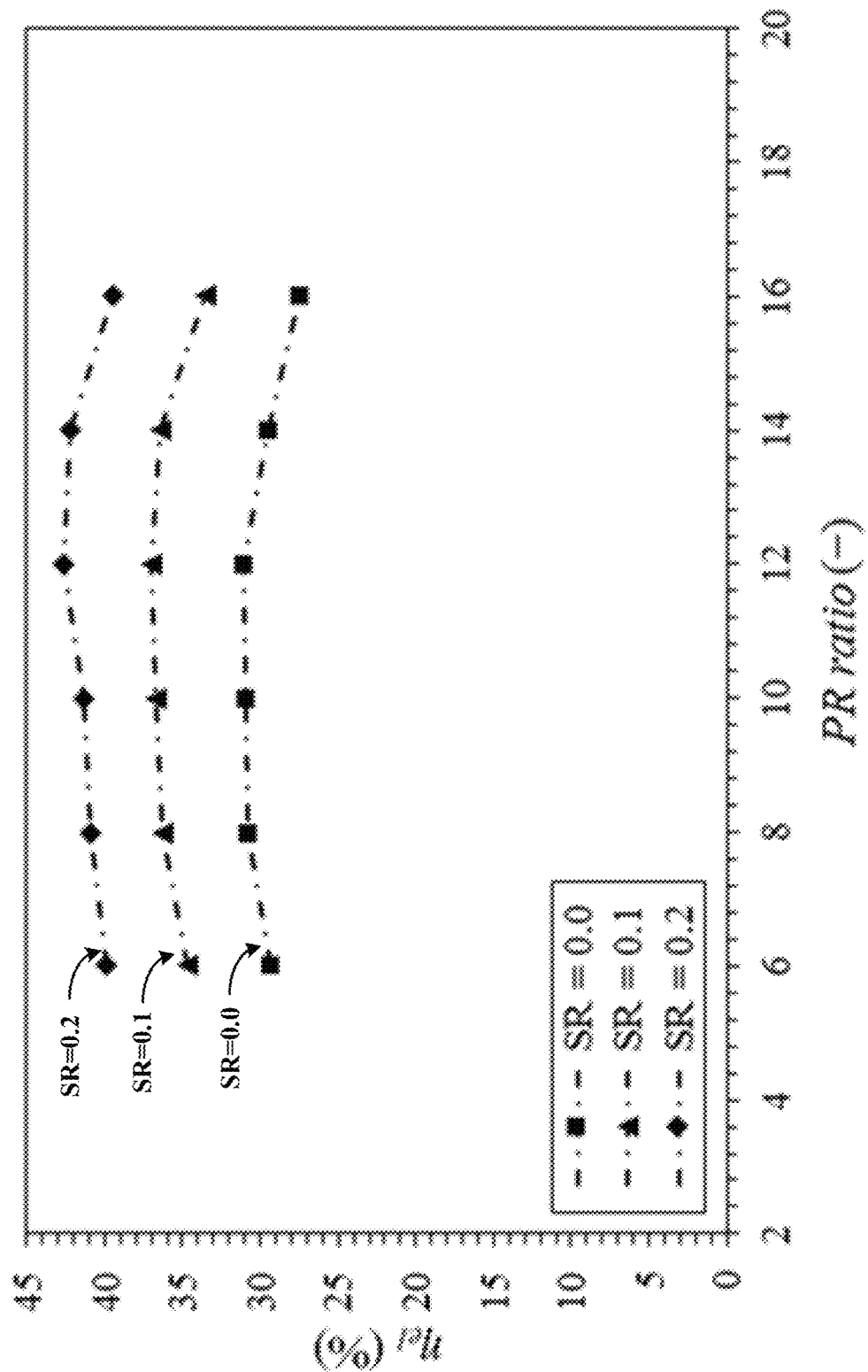
FIG. 8 is a graph illustrating the effect of pressure ratio (PR ratio) on the electrical efficiency at various split ratios (SR)

As discussed above, the PR ratio refers the ratio of operating pressures in the main units (i.e., gasification unit, CLC unit and power generation units) to the ambient pressure. For simulating the effect of changing the pressure ratio, an ASF ratio of 6 is applied in all runs. As illustrated in FIG. 8, the PR ratio has a minor influence on the electrical efficiency $\eta_{el}(\%)$. For instance, at a SR of 0.0, the highest electrical efficiency (31%) is found on the PR ratio which ranges from 8 to 12. The slightly lower electrical efficiency is observed when the value of the PR ratio is lower or higher than those optimum values. This finding can be related to the net energy production by considering the energy requirement for compression and energy produced from expansion. Higher operating pressures lead to higher energy production in TG-1, but also require more energy for air compression in CP-1. A similar result is found for the SR of 0.1 and 0.2. A significant influence is observed when the SR ratio is changed. The electrical efficiency dramatically increases by increasing the SR ratio. For example, at a PR ratio of 12, the electrical efficiency increases from 31% to 43% as the SR ratio is elevated from 0.0 to 0.2. This result can be explained by the significant contribution by the combustion chamber CB in elevating the inlet gas temperature at TG-1, resulting in higher electricity production. As discussed in the above section, this also indicates that the installation of CB and TG-1 free the dependence of the power generation system on the CLC unit temperature.

Figure 9:
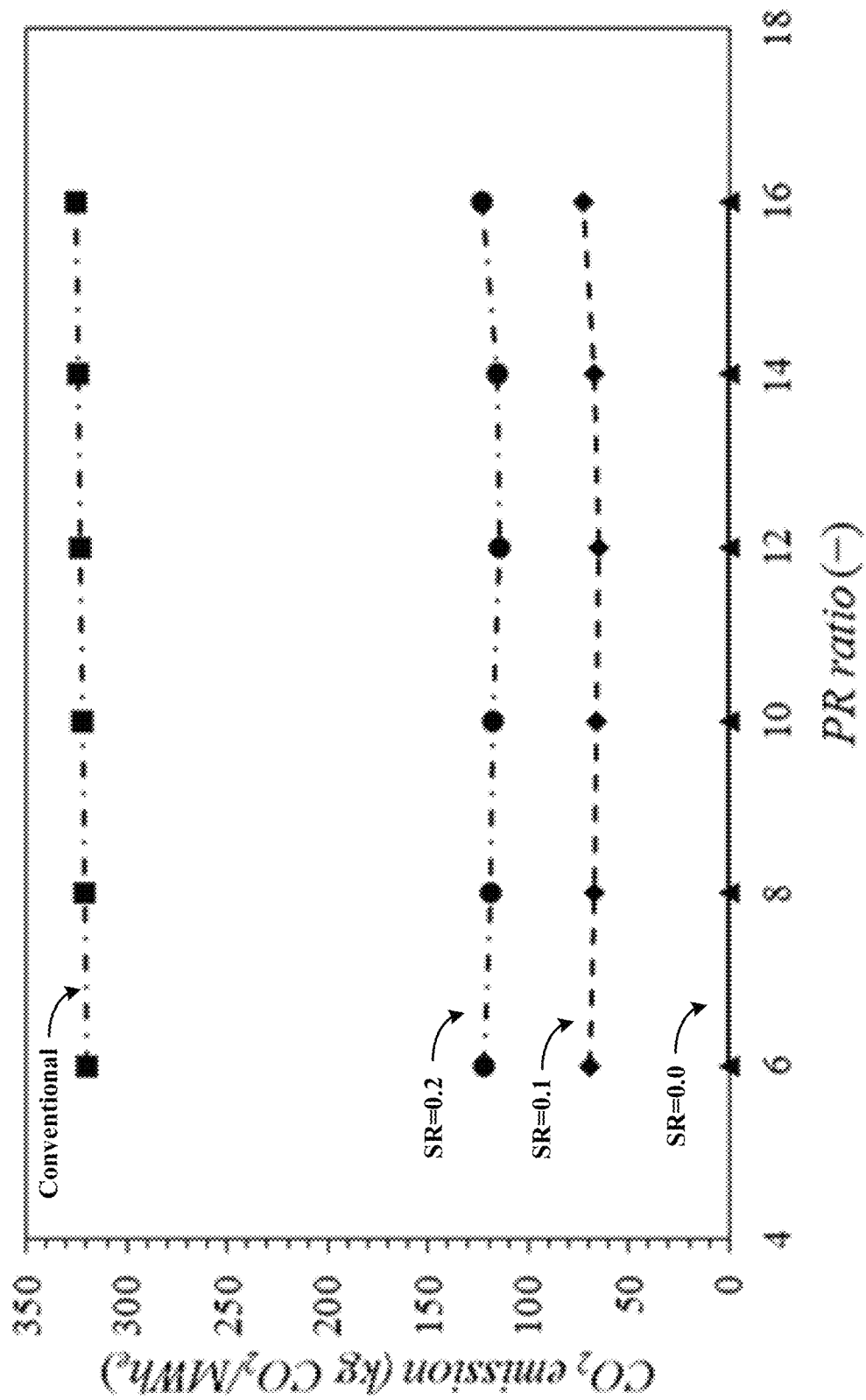
FIG. 9 is a graph illustrating the effect of pressure ratio (PR ratio) on the specific $CO_2$ emission at various split ratios (SR)

FIG. 9 shows that the $CO_2$ emission after supplying syngas to CB is still much lower than its counterpart released by the conventional diesel generator.

Figure 10:
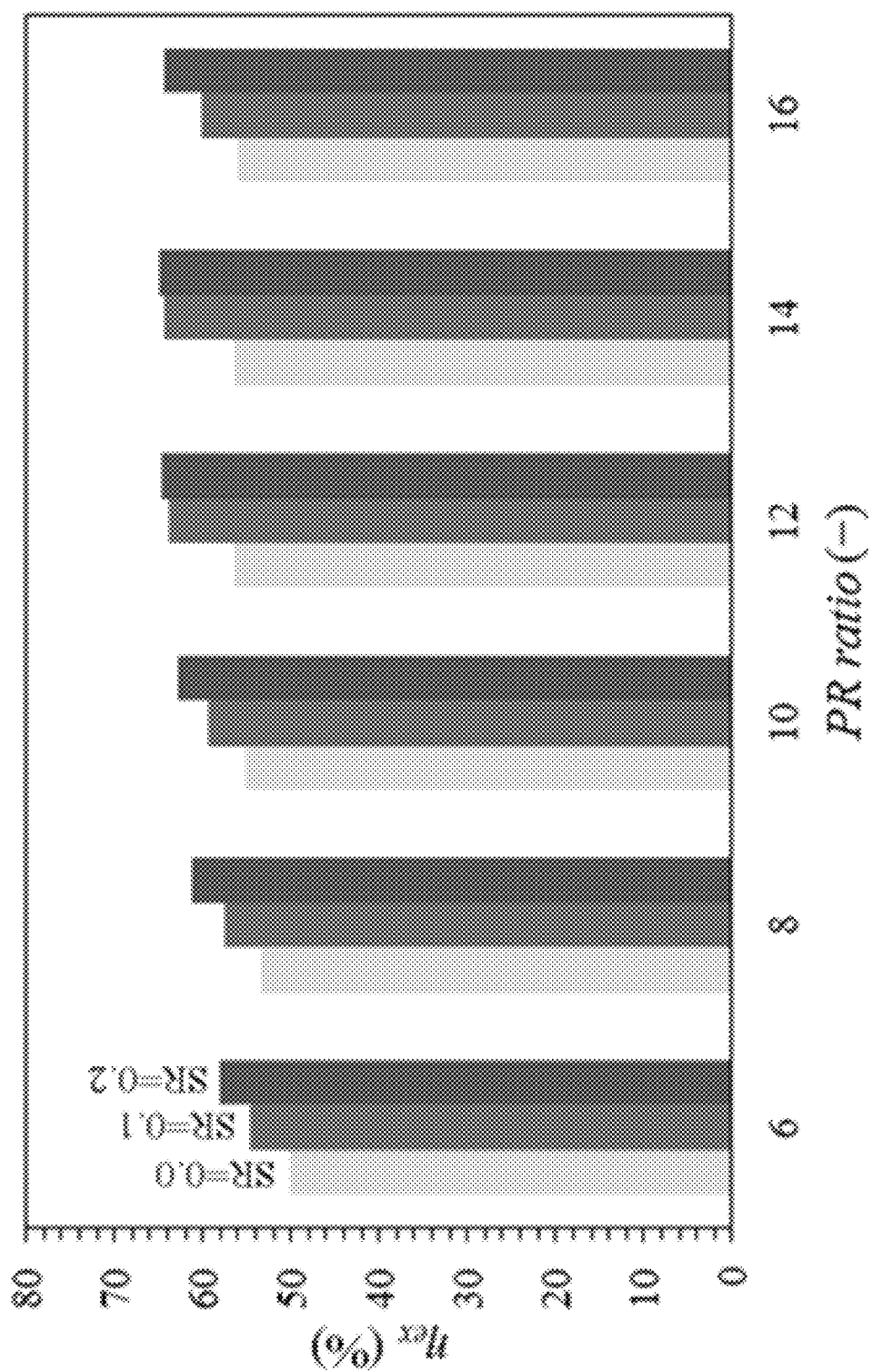
FIG. 10 is a graph illustrating the effect of PR ratio on the exergy efficiency at various split ratios (SR)
Figure 11A:
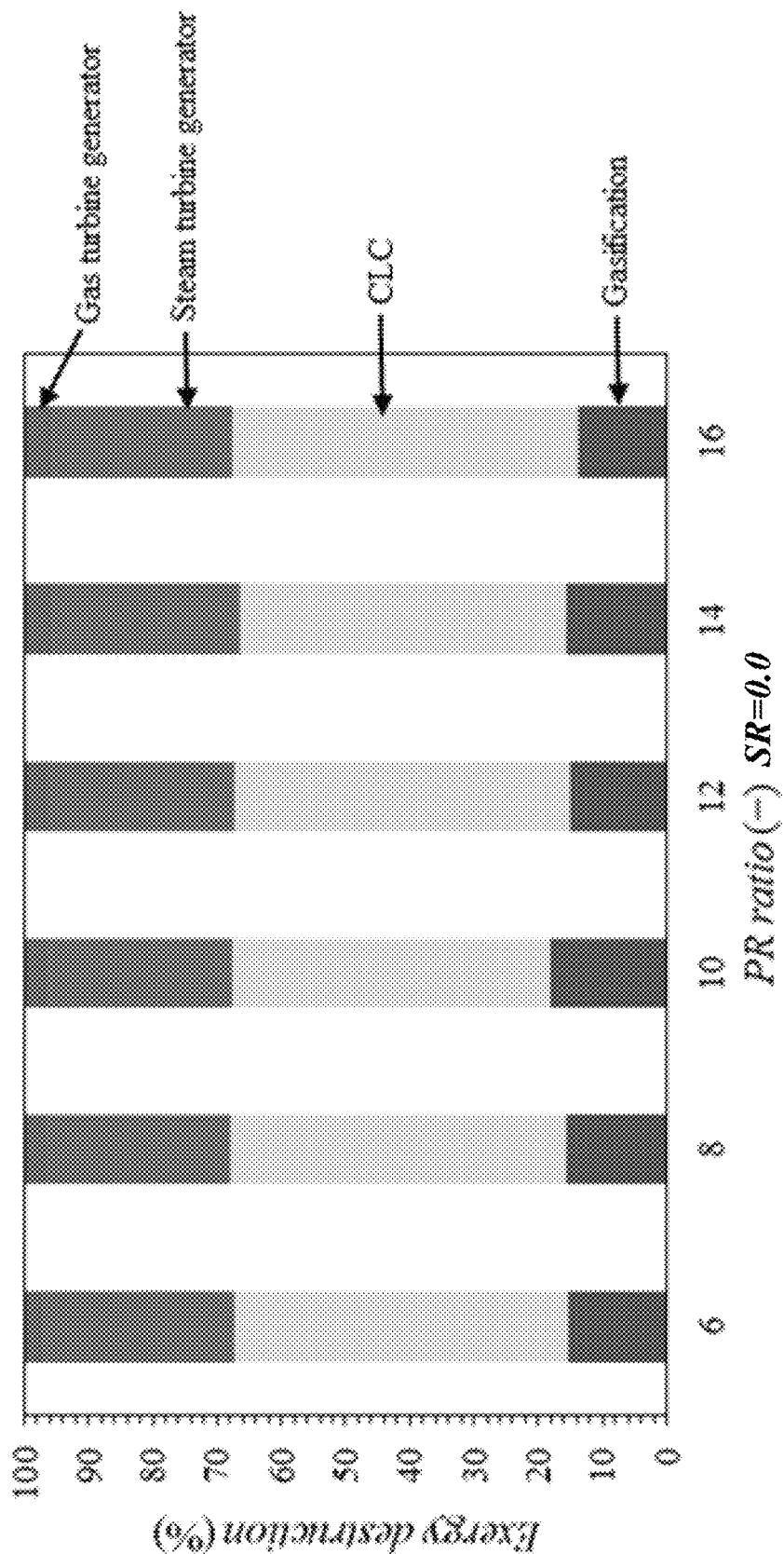
FIGS. 11A-11C are graphs illustrating the contribution of gasification CLC steam turbine generator and gas turbine generator on the exergy destruction at (a) SR=0.0, (b) SR=0.1, and (c) SR=0.2.
Figure 11B:
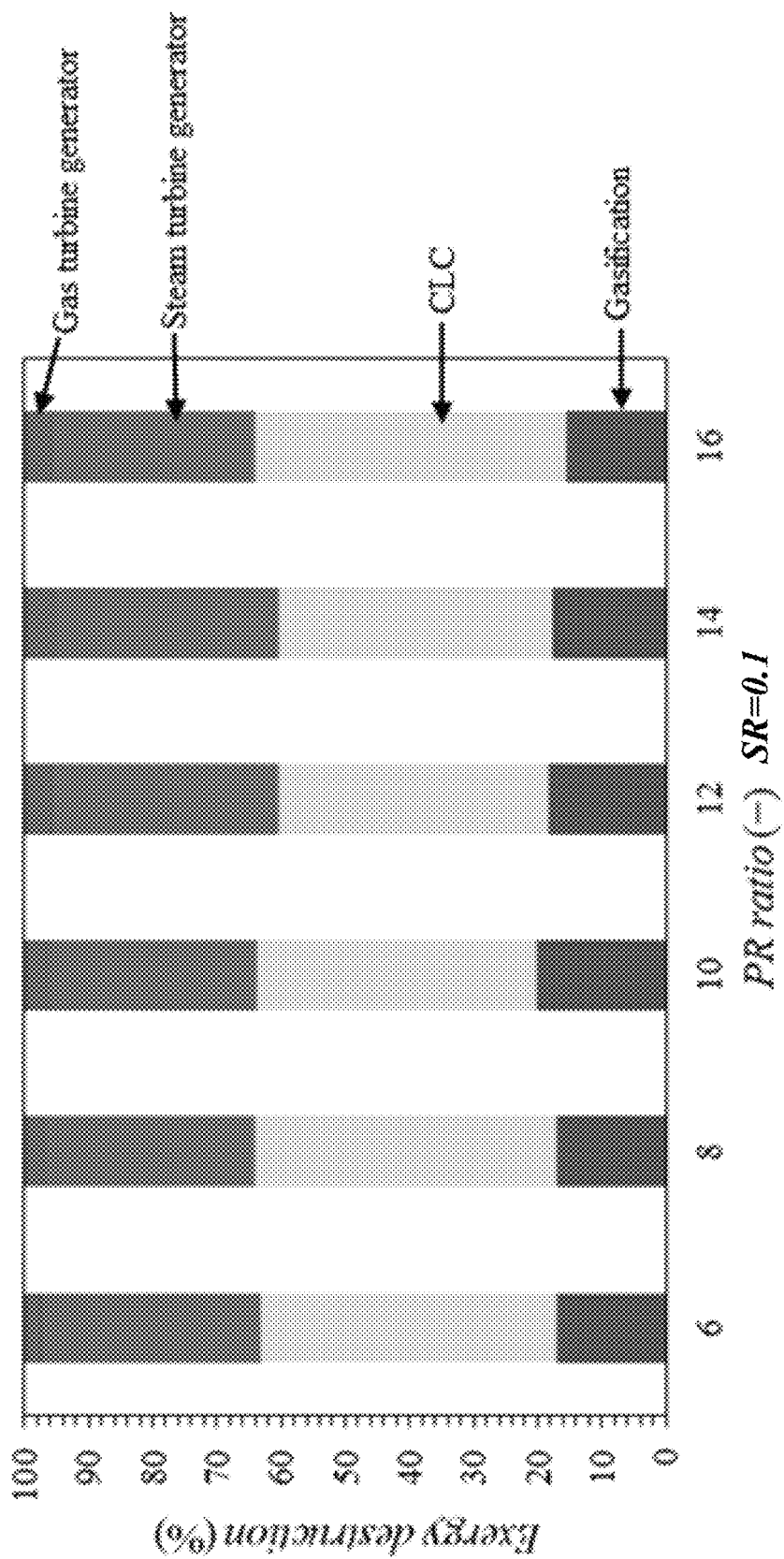
Figure 11C:
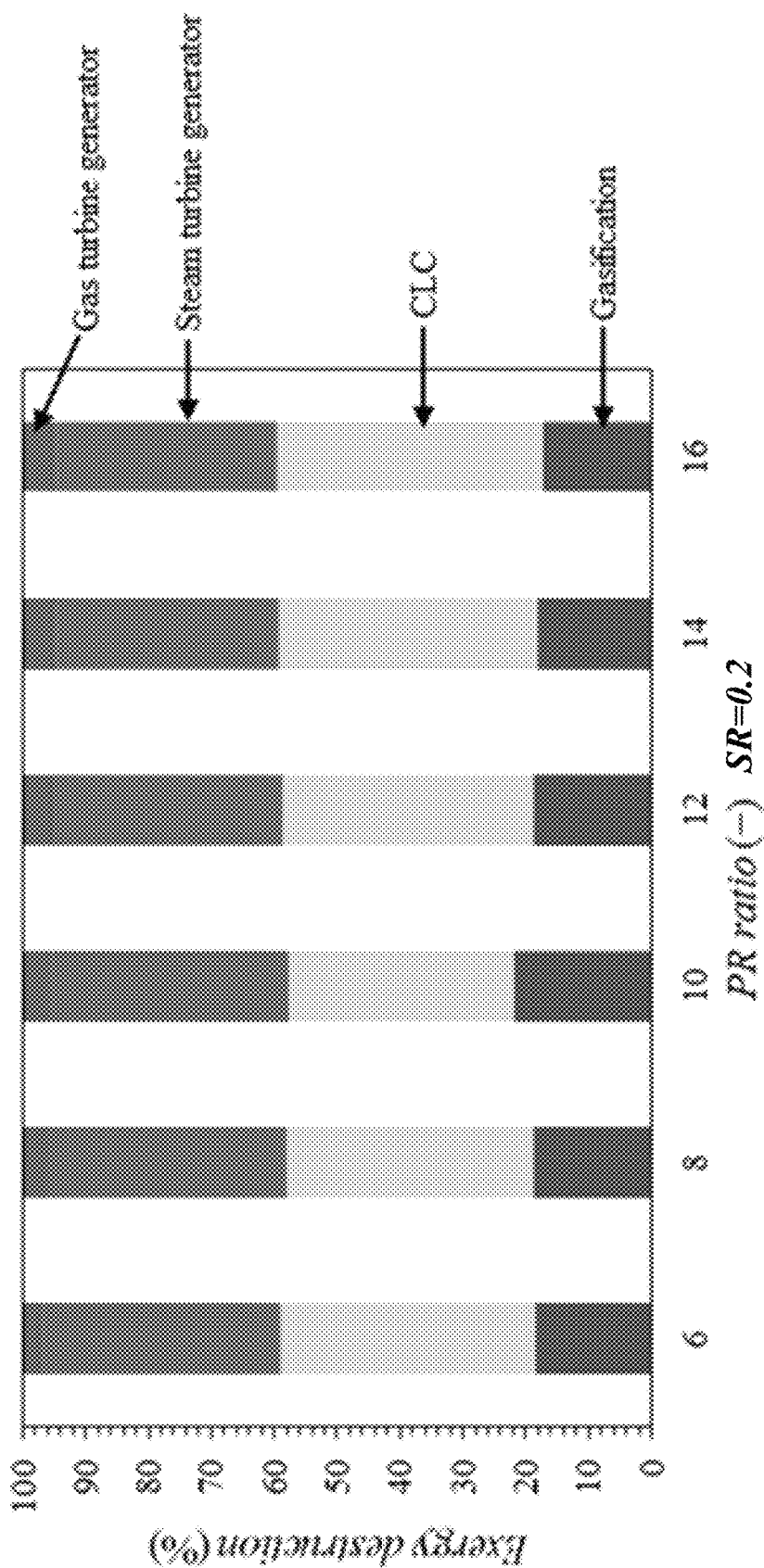
Figure 12A:
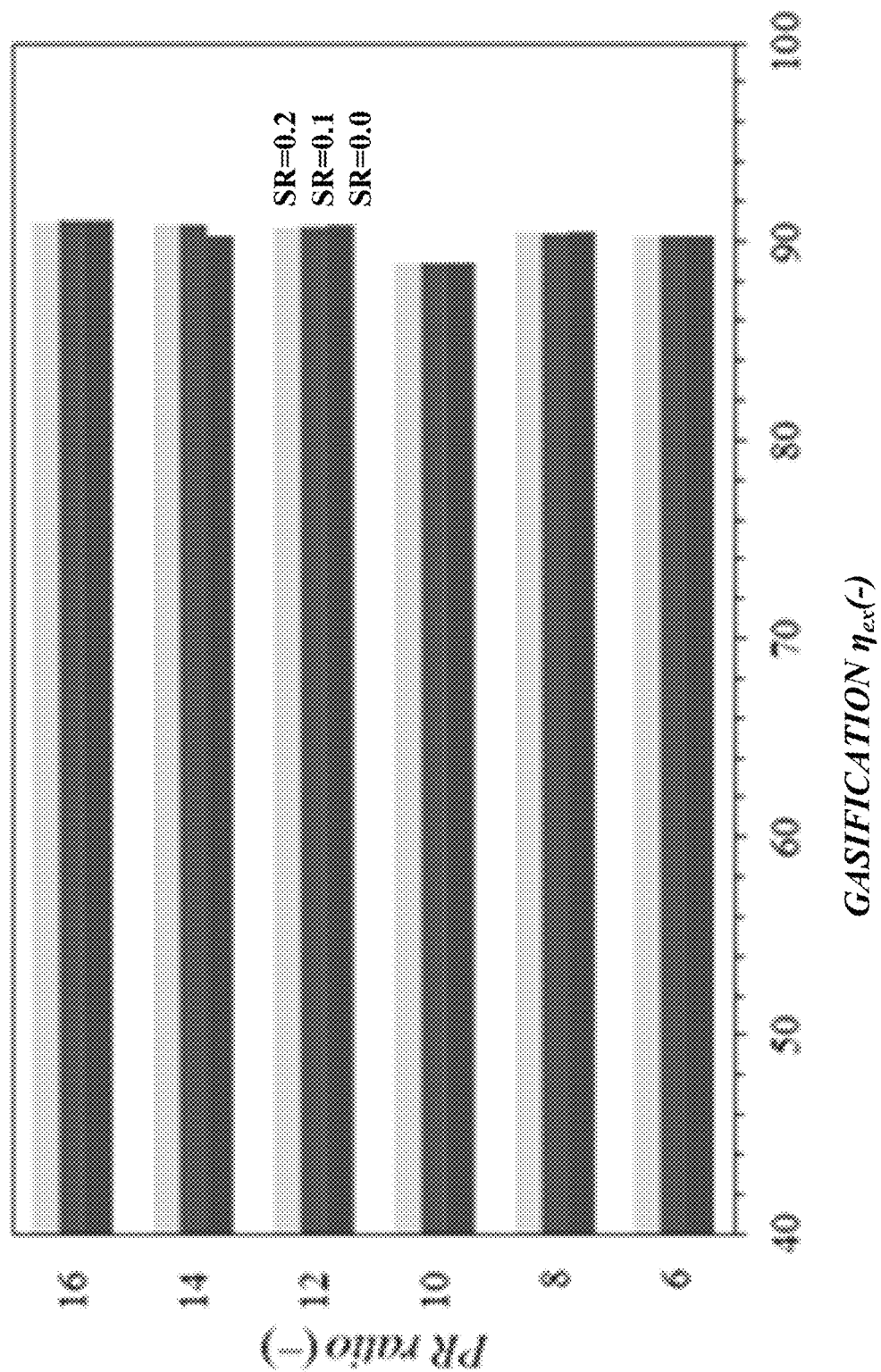
FIGS. 12A-12D are graphs illustrating the influence of PR ratio on exergy efficiency of (a) gasification process, (b) chemical looping combustion, (c) steam turbine generator, and (d) gas turbine generator at various SRs.
Figure 12B:
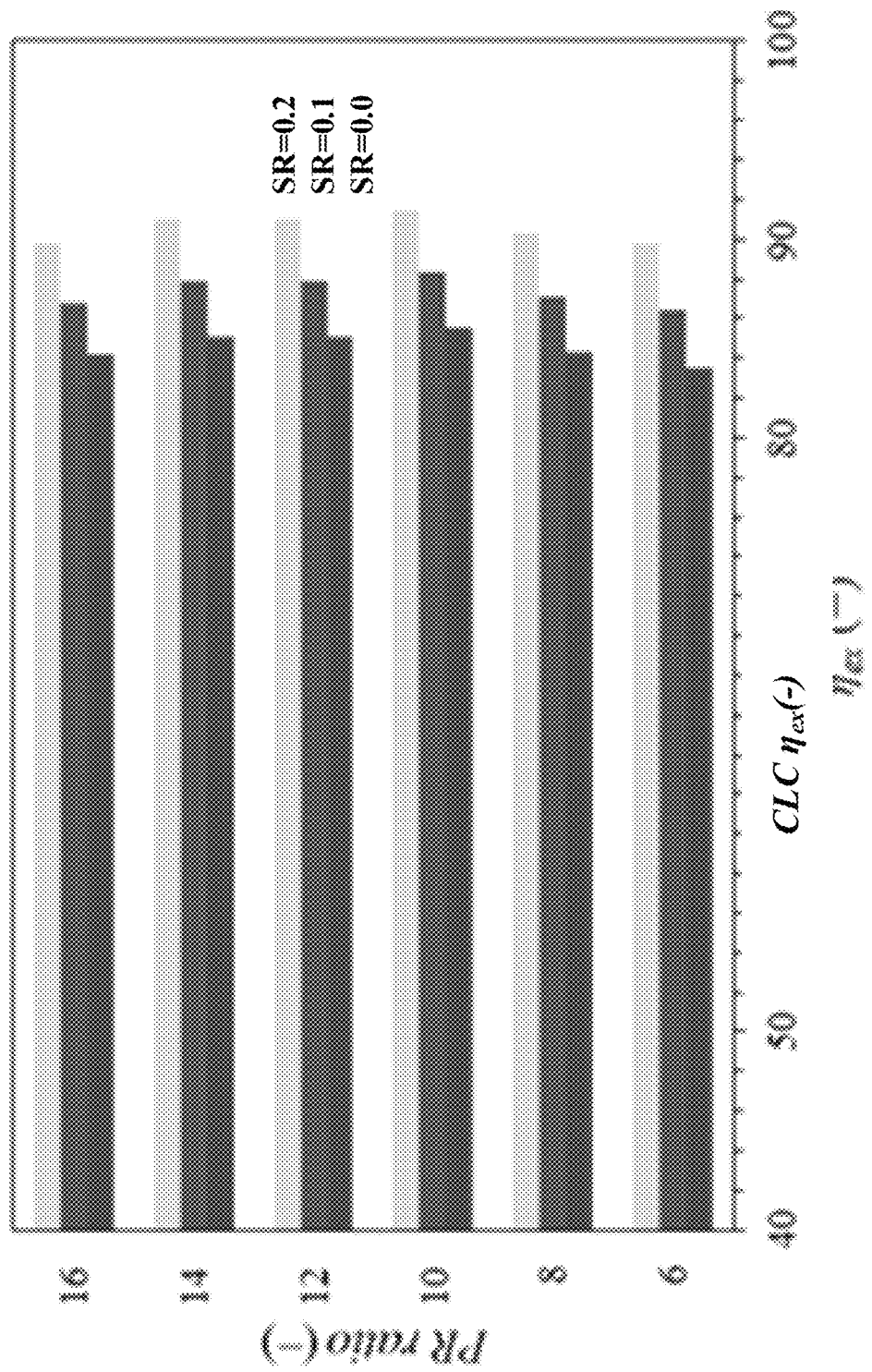
Figure 12C:
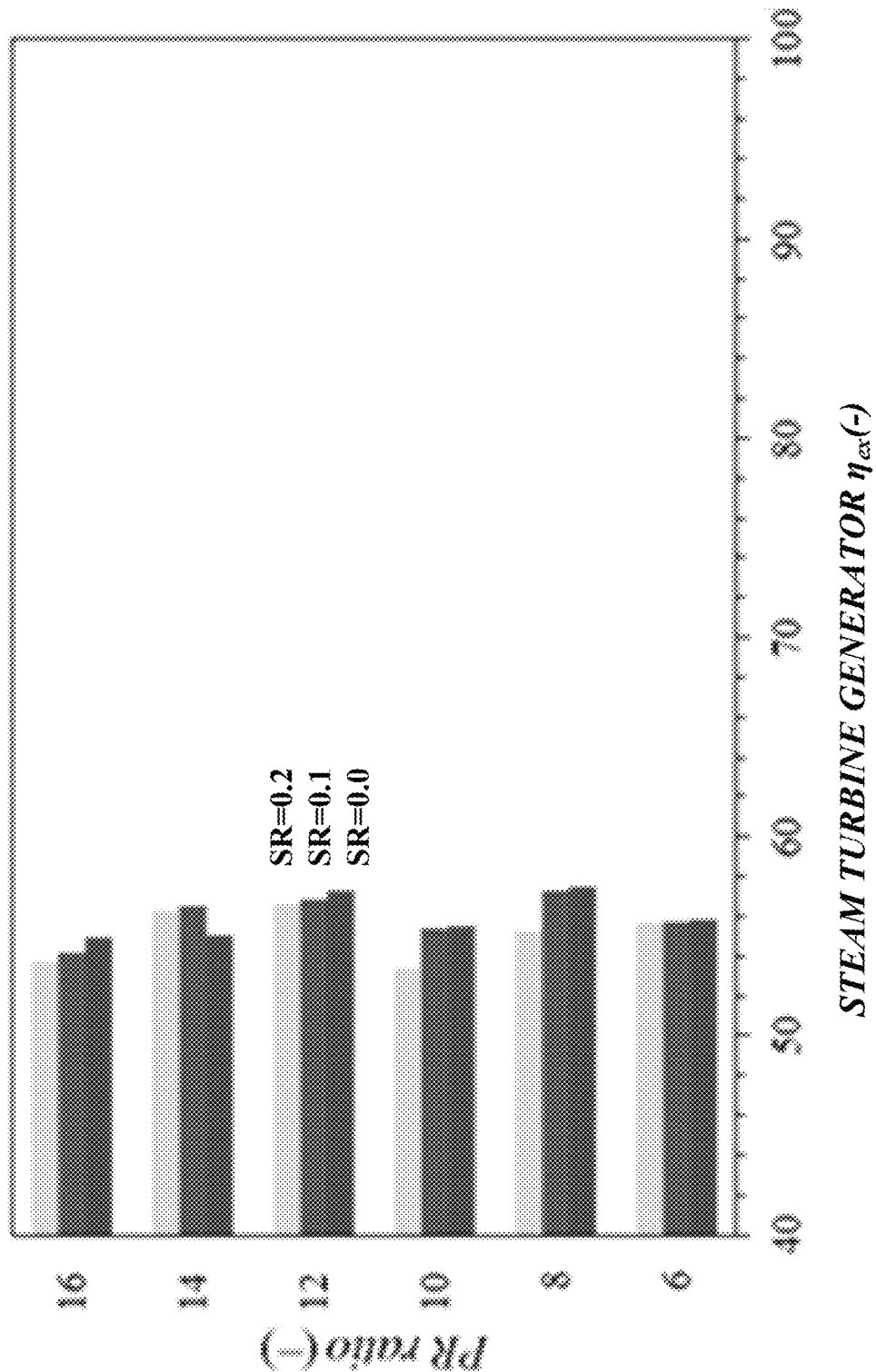
Figure 12D:
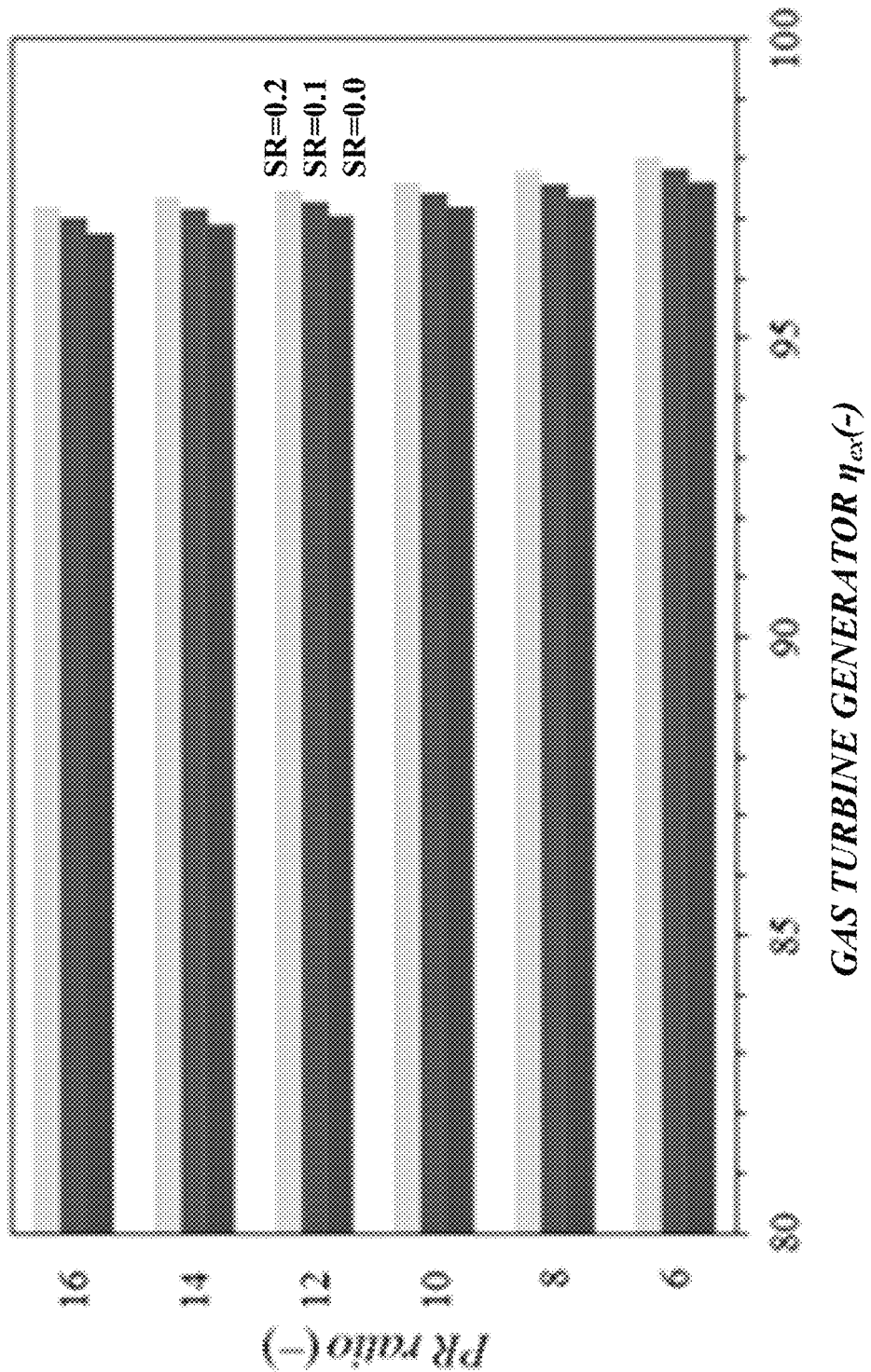

The PR ratio has a minor influence on the exergy efficiency, as shown in FIG. 10. For instance, the exergy efficiency increases from 50% to 56% with elevating PR ratios from 6 to 14, at a SR of 0.0. When the PR ratio is further increased from 14 to 16, the exergy efficiency slightly decreases by 1%. This result indicates that the PR ratio of 14 is optimum to deliver the highest exergy efficiency. The reason of increasing exergy efficiency is the increase of electricity output of TG-1 is higher than the energy consumption for air compression. The opposite phenomenon explains the decrease of exergy efficiency when the PR ratio is increased from 14 to 16. The increase of electricity production of TG-1 also results in an increasing contribution of gas turbine generation on exergy loss, as depicted in FIG. 11A-C. This is because the exergy destruction of the gas turbine increases with increasing turbine load due to exergy loss in turbine parts (i.e., combustion chamber and turbine blades). (See Fallah M, Siyahi H, Ghiasi R A, Mahmoudi S M S, Yari M, Rosen M A. Comparison of different gas turbine cycles and advanced exergy analysis of the most effective. Energy. 2016, Vol. 116, pp. 701-715, incorporated herein by reference in its entirety). The identical trend is also found at the SR ratio of 0.1 and 0.2, with the optimum exergy efficiency of 64% and 65%, respectively at PR ratio of 14 for both SR ratios. The exergy efficiency of each primary unit is summarized in FIG. 12A-12D. The exergy efficiency of gasification is illustrated in FIG. 12A. This figure shows that the PR ratio and the SR have a minor effect on the exergy efficiency. This is due to the small portion of energy which enters through HE-1 as fuel preheater. The minimum influence of the PR ratio on the exergy efficiency is also observed on the CLC unit, while A significant influence is found when the SR is changed. This is because the pressure effect on the solid-gas reaction is negligible as the simulation is developed according to the thermodynamic equilibrium. The increase of SR enhances the exergy efficiency due to the lower flow rate of syngas to CLC unit. Thus, the minimum exergy loss is due to lower production of low standard chemical exergy components as the product of R-2 (i.e., $H_2O$ and $CO_2$). The exergy efficiency of steam turbine fluctuates with variation of the PR ratio and SR from 6 to 16 and 0.0 to 0.2, respectively, as shown in FIG. 12C. This can be attributed to the fluctuation of exergy in the flue gas exiting both the CLC unit and the gas turbine generation unit, as depicted in FIG. 12B and FIG. 12D, respectively. Regarding the gas turbine unit, FIG. 12D shows that the exergy efficiency slightly declines with increasing PR ratio from 6 to 16, while the exergy efficiency considerably increases as the SR is increased. This result indicates that the increase of gas turbine loads due to increasing temperature has a stronger influence on the exergy efficiency than the influence due to increasing pressure. In addition, increasing the pressure ratio in the gas turbine unit leads to exergy loss in the combustion chamber.

An integrated chemical looping combustion and gasification for electricity generation and in-situ $CO_2$ capture was developed using a thermodynamic approach. The process includes (1) gasification of diesel to ensure complete conversion of fuel, (2) chemical looping combustion with supported nickel-based oxygen carrier on alumina, (3) gas turbine-based power generation and (4) steam turbine-based power generation. Simulation results show high accuracy as compared to conventional equipment. It is observed that oxidation air (ASF ratio) considerably influences the overall efficiency of the integrated system. The increase of syngas split ratio to combustion unit (SR ratio) significantly increases the overall efficiency. Thus, the SR ratio of 0.2 provides the highest performance:the highest overall electrical efficiency (42%) was observed with an ASF ratio of 6 and a PR ratio of 10, while the highest exergy efficiency (65%) is found for an ASF ratio and a PR ratio of 6 and 12, respectively. The integrated chemical looping combustion and gasification power generator and system using diesel fuel provides improvements in exergy efficiency of the electrical power generation, exhausts clean flue gases to the atmosphere and recovers water from the process and recovers pure $CO_2$. Thus the generation device is environmentally friendly.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A diesel fueled chemical-looping combustion (CLC) electrical power generation system, comprising:
a feed source of diesel fuel;
a gasification chamber fluidly connected to the feed source, the gasification chamber including a first heat exchanger, a gasification reactor and a gasification splitter;
a chemical looping combustion chamber fluidly connected to the gasification chamber, the chemical looping combustion chamber including a first reduction reactor, a first splitter, a second reduction reactor and a second splitter;
a gas combustion chamber fluidly connected at a first input to a first output of the first splitter and at a second input to the gasification splitter;
a gas turbine power generator connected to the combustor;
at least one steam turbine electrical power generator;
a heat recovery unit fluidly connected to the at least one steam turbine electrical power generator and to the gasification chamber, the heat recovery unit including a second heat exchanger and a plurality of steam generators; and
a $CO_2$ gas purification stage connected to the heat recovery unit, the $CO_2$ gas purification stage including a plurality of condensers and a plurality of compressors.

2. The system of claim 1, wherein the first heat exchanger is connected at a first input to the diesel fuel source, and at a second input to the heat recovery unit;
wherein the gasification reactor is connected at a first input to an output of the first heat exchanger, at a second input to an oxygen source and wherein the gas output from the gasification reactor is syngas;
wherein the gasification splitter is connected at an input to an output of the gasification reactor; and
wherein the gasification splitter splits the syngas into a first stream and a second stream, wherein the first stream is fluidly connected to the second input of the gas combustion chamber and the second stream is fluidly connected to the second heat exchanger.

3. The system of claim 2, wherein a first input of the first reduction reactor of the chemical looping combustion chamber is connected to a source of compressed air (CP-1), an output of the first reduction reactor is connected to an input of the first splitter (SL-1), a first input of the second reduction reactor is connected to a second output of the first splitter, an input of the second splitter is connected to an output of the second reduction reactor, a first output of the second splitter is connected to a second input of the heat recovery unit and a second output of the second splitter is connected to a second input of the first reduction reactor.

4. The system of claim 3, wherein the first reduction reactor includes a first fluidized bed of reduced nickel and alumina, wherein the compressed air reacts with the reduced nickel to form a compressed stream of NiO, $N_2$ and $O_2$;
wherein the first splitter separates the $N_2$ and $O_2$ into a third compressed stream and the NiO into a fourth compressed stream;
wherein the first output of the first splitter is the third compressed stream and the second output of the first splitter is the fourth compressed stream.

5. The system of claim 4, wherein the second reduction reactor includes a second fluidized bed of alumina;
wherein a first input of the second reduction reactor receives the fourth compressed stream;
wherein a second input of the second reduction reactor is connected to a first output of the second heat exchanger and receives high temperature syngas;
wherein the NiO of the fourth compressed stream and the high temperature syngas react with the alumina to form an output stream of high temperature $H_2O$, reduced nickel and $CO_2$;
wherein the second splitter separates the $H_2O$ and $CO_2$ into a fifth stream and the reduced nickel into a sixth stream;
wherein the fifth stream passes through the first output of the second splitter and the sixth stream passes through the second output of the second splitter.

6. The system of claim 5, wherein the gas combustion chamber is connected to the first output of the first splitter and receives the third stream, mixing the third stream with the syngas;

wherein the gas combustion chamber heats the mixed third stream and syngas to output a high temperature stream to a first input of the gas turbine electrical power generator.

7. The system of claim 6, wherein the gas turbine electrical power generator further comprises turbine blades, a motor shaft, a first electrical generator operatively connected to the motor shaft, an electrical output connector and an exhaust port;
   wherein the high temperature stream spins the turbine blades;
   wherein the turbine blades rotate the shaft causing the first generator to generate electricity and exhaust to emit from the exhaust port.

8. The system of claim 7, wherein the heat recovery unit further comprises:
   a second heat exchanger (HE-2) and a plurality of steam generators (SG-1a, SG-1b, SG-1c);
   wherein a first input of the second heat exchanger is connected to a second output of the second splitter (SL-2), a second input of the second heat exchanger is connected to a first output of a first steam generator and a first output of the second heat exchanger is connected to a second input of the third reduction reactor (R-2);
   wherein a first input of the first steam generator is connected to the exhaust port of the gas turbine electrical power generator, a second input is connected to the first output of the third splitter (SL-3);
   wherein a first input of a second steam generator is connected to a second output of the first steam generator, a second input of the second steam generator is connected to a third output of the first steam generator;
   wherein a first input of a third steam generator is connected to a first output of the second steam generator, a second input of the third steam generator is connected to a second output of the second steam generator, a first output of the third steam generator is flue gas exhaust port and a second output of the third steam generator is connected to an input of the $CO_2$ gas purification stage; and
   wherein each of the plurality of steam generators has a third input connected to an output of a first condenser located between the third input and an output of the steam turbine electrical power generator.

9. The system of claim 8, wherein the steam turbine electrical power generator comprises a plurality of steam turbine electrical generators;
   wherein a first steam turbine electrical generator (TG-2) includes an input connected to a second output of the second heat exchanger (HE-2), a steam exhaust output connected to a fourth input of the second steam generator, and a second electrical output connector;
   wherein a second steam turbine electrical generator (TG-3) has an input connected to a third output of the second steam generator, and a third electrical output connector;
   wherein a third steam turbine electrical generator (TG-4) has an input connected to a third output of a third steam generator, a steam exhaust output connected to first condenser, and a fourth electrical output connector.

10. The system of claim 9, wherein the $CO_2$ gas purification stage includes at least one second condenser (CS) and at least one second compressor (CP-2, CP-3);
   wherein the at least one second condenser is configured to receive gas comprising water and $CO_2$ from the second output of the third steam generator, remove the water by condensation from the gas;
   wherein the at least one second compressor pressurizes the gas and outputs the $CO_2$.

11. The system of claim 10, wherein the input of the first steam turbine electrical power generator receives high pressure steam from the second heat exchanger, the input of the second steam turbine electrical power generator receives intermediate pressure steam from the second steam generator, and the input of the third steam turbine electrical power generator receives low pressure steam from the third steam generator.

12. The system of claim 11, wherein the high pressure steam is in the range of 60-80 bar, preferably 78.2 bar;
   wherein the intermediate pressure steam is in the range of 10-25 bar, preferably 18.4 bar; and
   wherein the low pressure steam is in the range of 1-5 bar, preferably 1.8 bar.

13. The system of claim 12, wherein each splitter further comprises an adjustable valve configured to control the percentage of gas emitted from each output.

14. The system of claim 13, wherein the feed source of diesel fuel and the oxygen source are each connected to adjustable valve configured to control the percentage of gas emitted from each source.

15. The system of claim 14, further comprising a controller having circuitry configured to control each adjustable valve, each compressor and monitor the electricity generated to cause the diesel fueled chemical-looping combustion (CLC) electrical power generation system to generate electricity, recover $CO_2$ and emit clean flue gases.

16. A diesel fueled chemical-looping combustion (CLC) electrical power generation method, comprising:
   heating, by heat from a heat recovery unit, diesel fuel combined with oxygen, wherein the diesel fuel is received from a diesel fuel feed source and the oxygen is received from an oxygen source;
   separating, by a first gasification reactor, the heated diesel fuel into a gaseous element stream including at least $H_2$, $CO_2$, $H_2O$, $CH_4$ and coke;
   splitting the gaseous element stream into a first stream and a second stream;
   separating, by chemical looping combustion, the $CO_2$ and $H_2O$ of the first stream from solid components;
   combusting, by a combustor, the second stream;
   converting, by a gas turbine electrical generator, the combusted second stream to electricity and a first exhaust stream;
   recovering heat, by a heat recovery unit, from the $CO_2$ and the $H_2O$ of the first stream and from the first exhaust stream;
   outputting, by the heat recovery unit, a cooled exhaust stream comprising $CO_2$ and $H_2O$;
   converting, by at least one steam generator, the recovered heat and $H_2O$ to steam;
   generating electricity, by at least one steam turbine electrical generator, from the steam;
   separating, by at least one condenser of a $CO_2$ gas purification stage, the $CO_2$ from $H_2O$ of the cooled exhaust stream; and
   storing the $CO_2$.

17. The diesel fueled chemical-looping combustion (CLC) electrical power generation method of claim 16, wherein separating by chemical looping combustion further comprises:
   combining the $H_2$, $CO_2$, $H_2O$, $CH_4$ and coke of the first stream with oxygen;

reducing, by at least one reduction reactor comprising nickel (Ni) on an alumina ($Al_2O_3$) support, the oxygenated first stream into $H_2O$, $O_2$, $N_2$ $CO_2$, reduced Ni and coke;

combusting the $O_2$ and $N_2$ in the combustor;

splitting the coke and reduced Ni from the $H_2O$ and $CO_2$; and sending the $H_2O$ and $CO_2$ to the heat recovery unit.

18. The diesel fueled chemical-looping combustion (CLC) electrical power generation method of claim 17, further comprising adjusting, by a controller having circuitry configured to control the system, the percentage of gas emitted from each splitter, the percentage of gas emitted from the feed source of diesel fuel, the percentage of oxygen emitted from the oxygen source and monitor the electrical outputs to generate electricity, recover $CO_2$ and emit clean flue gases.

* * * * *